US012689955B2

(12) United States Patent
Hong

(10) Patent No.: US 12,689,955 B2
(45) Date of Patent: Jul. 21, 2026

(54) METHOD FOR SENDING INDICATION, METHOD FOR SENDING INFORMATION, AND METHOD FOR SOLVING MULTI-CARD PROBLEM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 326 days.

(21) Appl. No.: 18/286,718

(22) PCT Filed: Apr. 16, 2021

(86) PCT No.: PCT/CN2021/087891
§ 371 (c)(1),
(2) Date: Oct. 12, 2023

(87) PCT Pub. No.: WO2022/217605
PCT Pub. Date: Oct. 20, 2022

(65) Prior Publication Data
US 2024/0224143 A1     Jul. 4, 2024

(51) Int. Cl.
*H04W 36/08* (2009.01)
*H04W 8/18* (2009.01)
(Continued)

(52) U.S. Cl.
CPC ....... *H04W 36/08* (2013.01); *H04W 36/0064* (2023.05); *H04W 8/183* (2013.01); *H04W 36/0072* (2013.01); *H04W 88/06* (2013.01)

(58) Field of Classification Search
CPC . H04W 36/08; H04W 88/06; H04W 36/0072; H04W 36/0064; H04W 8/183
See application file for complete search history.

(56) References Cited

U.S. PATENT DOCUMENTS 9,100,888 B2 * 8/2015 Roullier ................ H04W 68/02
10,462,724 B2 * 10/2019 Krishnamoorthy ..........................
H04W 36/0085
(Continued)

FOREIGN PATENT DOCUMENTS

CN      103533587 A     1/2014
CN      107743720 A     2/2018
(Continued)

OTHER PUBLICATIONS

NTT Docomo, "Impact of inter eNB Handover on Location Reporting procedure", 3GPP; R3-080102, RAN WG3; 20080205, Feb. 11-15, 2008.
(Continued)

*Primary Examiner* — Angela Widhalm De Rodriguez
(74) *Attorney, Agent, or Firm* — Cozen O'Connor

(57) ABSTRACT

A method for sending an indication, applied to a first base station is provided. The method includes sending first information to a core network, in response to receiving a multi-card problem of a terminal and determining to hand over the terminal to a second base station, in which the first information carries related information of the multi-card problem, and the first information is configured to instruct the core network to send the related information of the multi-card problem to the second base station.

18 Claims, 9 Drawing Sheets

(51) Int. Cl.
    *H04W 36/00*     (2009.01)
    *H04W 88/06*     (2009.01)

(56) References Cited

U.S. PATENT DOCUMENTS

| | | | |
|---|---|---|---|
| 11,510,114 B2 * | 11/2022 | Yiu ................... | H04W 36/0072 |
| 2017/0353893 A1 * | 12/2017 | Marwah ............ | H04W 36/0058 |
| 2021/0120524 A1 * | 4/2021 | Palle ................... | H04W 68/005 |
| 2022/0210713 A1 * | 6/2022 | Hong ................ | H04W 36/0011 |
| 2023/0247701 A1 * | 8/2023 | Ozturk .................. | H04W 8/183 |
| | | | 370/329 |

FOREIGN PATENT DOCUMENTS

| | | | |
|---|---|---|---|
| CN | 110337825 A | 10/2019 | |
| CN | 110495208 A | 11/2019 | |
| EP | 2466970 A1 | 6/2012 | |

OTHER PUBLICATIONS

Office Action dated Dec. 18, 2024 issued in CN application No. 202180001039.3, 12 pages.
European Patent Application No. 21936480.9 Search Report dated Jan. 15, 2025, 17 pages.
PCT/CN2021/087891, International Search Report dated Dec. 22, 2021, 3 pages.
Qualcomm Inc. "Options for paging collision avoidance" 3GPP TSG-RAN WG2 Meeting #113bis-e, R2-2103225, Apr. 2021, 3 pages.
ZTE Corporation et al. "Consideration on the Paging Collision" 3GPP TSG-RAN WG2 Meeting #113bis-e, R2-2104242, Apr. 2021, 7 pages.

* cited by examiner sending first information to a core network, in response to receiving a multi-card problem of a terminal and determining to hand over the terminal to a second base station, in which the first information carries related information of the multi-card problem, and the first information is configured to indicate the core network to send the related information of the multi-card problem to the second base station ⟩∼ S101

FIG. 1

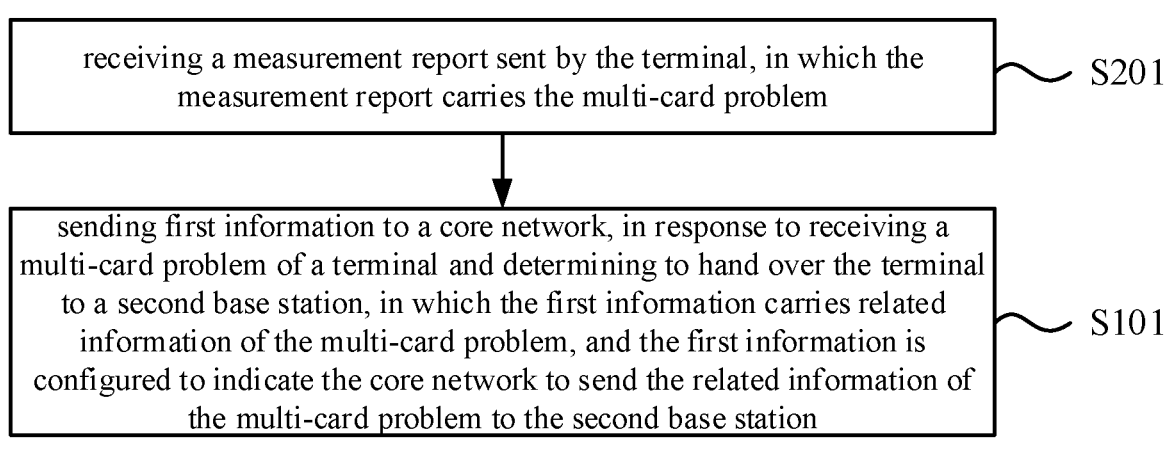

receiving a measurement report sent by the terminal, in which the measurement report carries the multi-card problem ⟩∼ S201 sending first information to a core network, in response to receiving a multi-card problem of a terminal and determining to hand over the terminal to a second base station, in which the first information carries related information of the multi-card problem, and the first information is configured to indicate the core network to send the related information of the multi-card problem to the second base station ⟩∼ S101

FIG. 2

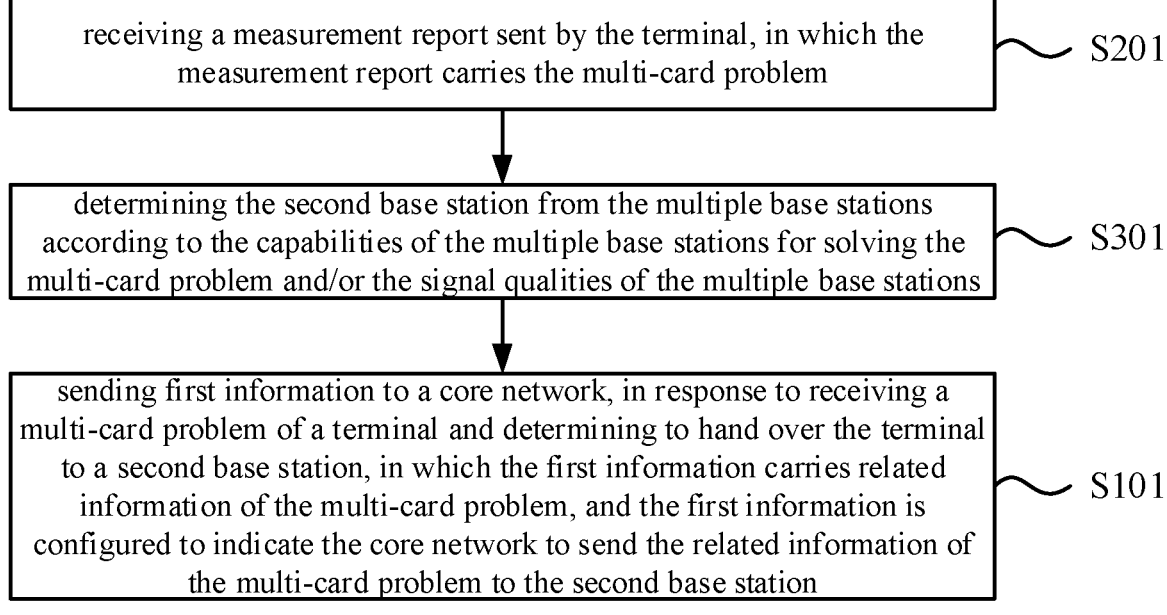

receiving a measurement report sent by the terminal, in which the measurement report carries the multi-card problem ⟩∼ S201 determining the second base station from the multiple base stations according to the capabilities of the multiple base stations for solving the multi-card problem and/or the signal qualities of the multiple base stations ⟩∼ S301 sending first information to a core network, in response to receiving a multi-card problem of a terminal and determining to hand over the terminal to a second base station, in which the first information carries related information of the multi-card problem, and the first information is configured to indicate the core network to send the related information of the multi-card problem to the second base station ⟩∼ S101

FIG. 3 receiving a measurement report sent by the terminal, in which the measurement report carries the multi-card problem ~ S201 determining the second base station according to the indication information ~ S401 sending first information to a core network, in response to receiving a multi-card problem of a terminal and determining to hand over the terminal to a second base station, in which the first information carries related information of the multi-card problem, and the first information is configured to indicate the core network to send the related information of the multi-card problem to the second base station ~ S101

FIG. 4 sending first information to a core network, in response to receiving a multi-card problem of a terminal and determining to hand over the terminal to a second base station, in which the first information carries related information of the multi-card problem, and the first information is configured to indicate the core network to send the related information of the multi-card problem to the second base station ~ S101 determining a configuration for solving the multi-card problem according to the second information from the core network ~ S501 performing a corresponding configuration for the terminal according to the configuration ~ S502

FIG. 5 receiving first information sent by a first base station, in which the first information carries related information of a multi-card problem of a terminal, and the first information is configured to indicate the core network to send the related information of the multi-card problem to a second base station ~ S601 sending the related information of the multi-card problem to the second base station ~ S602

FIG. 6

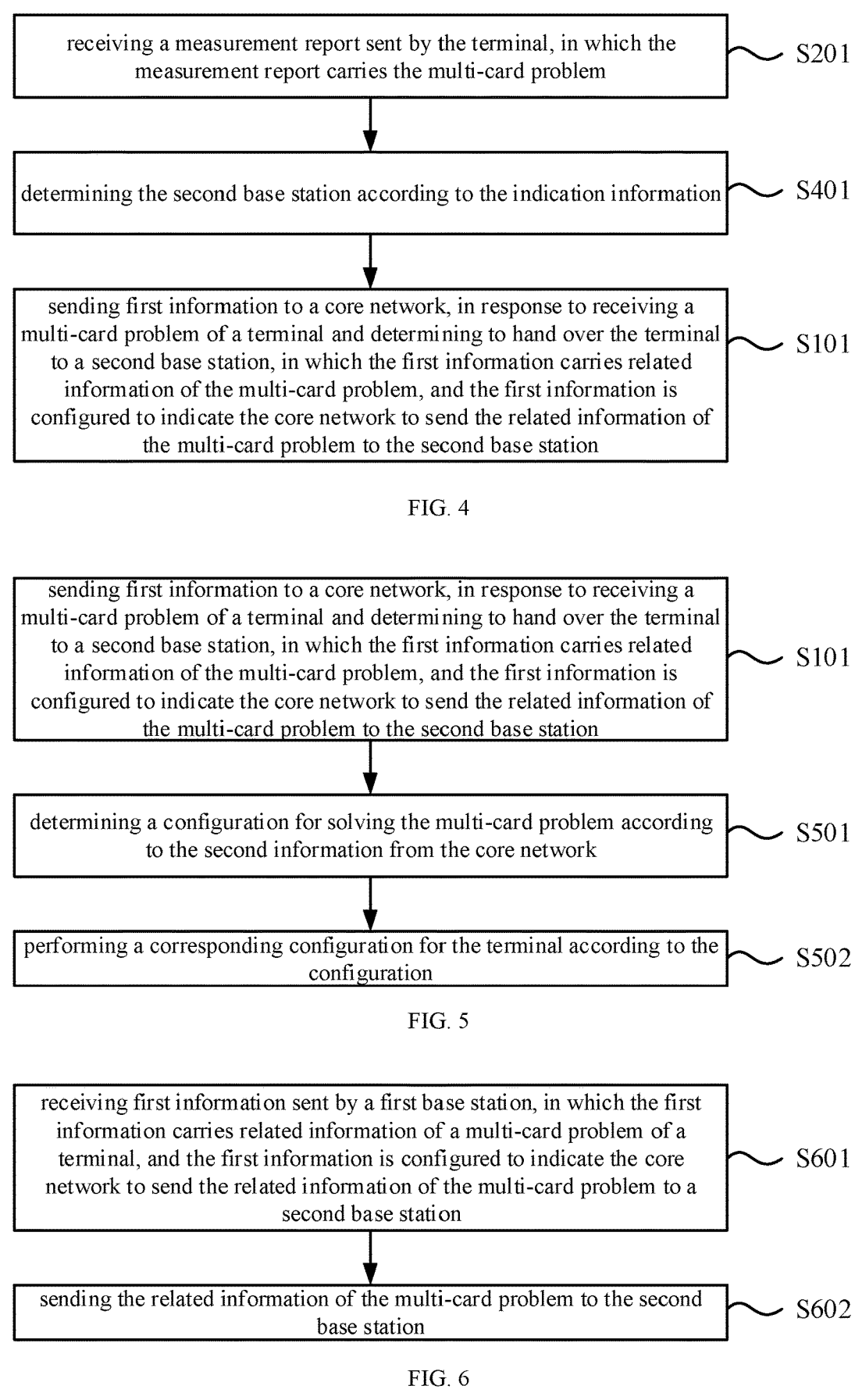

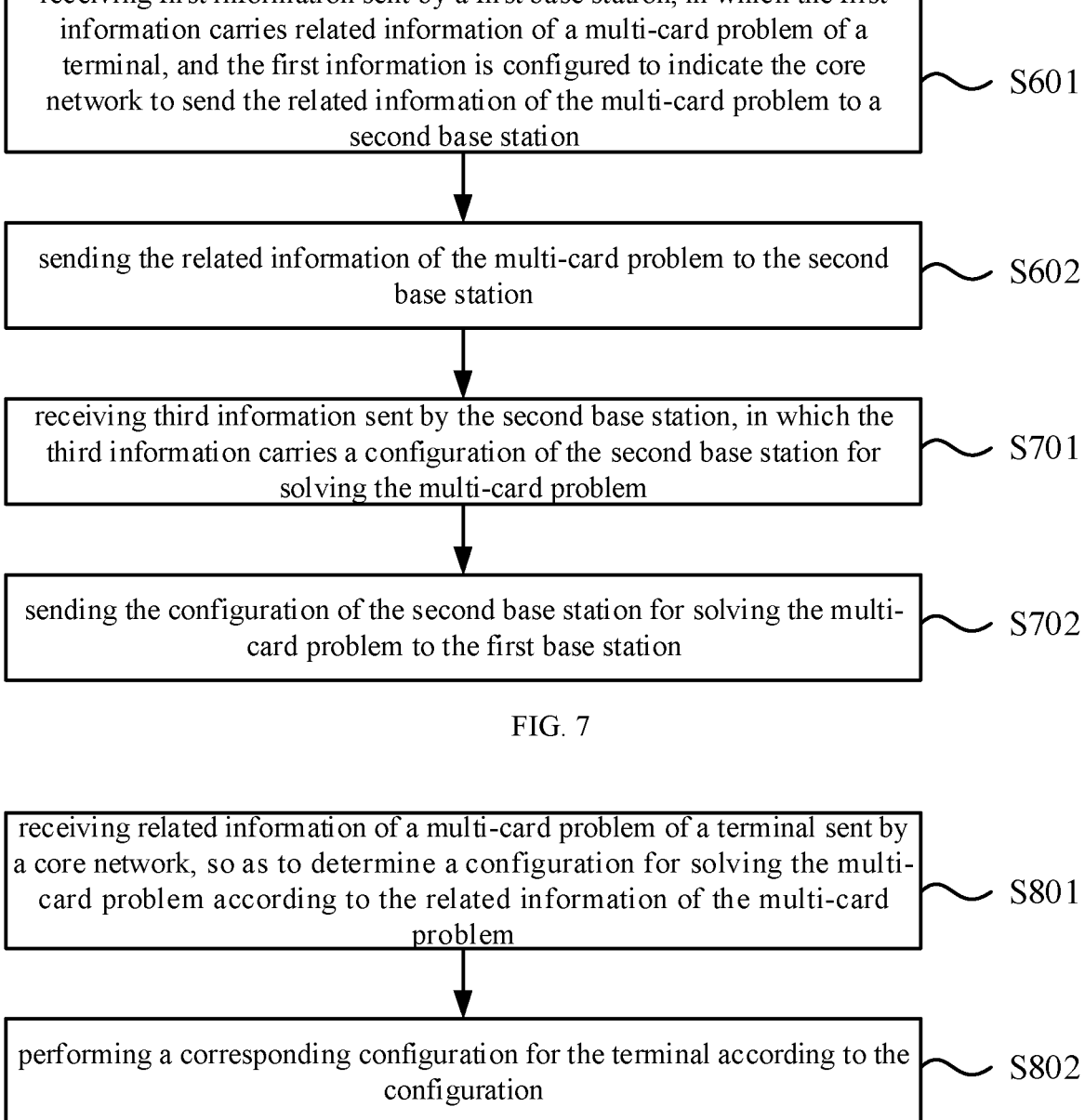

receiving first information sent by a first base station, in which the first information carries related information of a multi-card problem of a terminal, and the first information is configured to indicate the core network to send the related information of the multi-card problem to a second base station ⟿ S601 sending the related information of the multi-card problem to the second base station ⟿ S602 receiving third information sent by the second base station, in which the third information carries a configuration of the second base station for solving the multi-card problem ⟿ S701 sending the configuration of the second base station for solving the multi-card problem to the first base station ⟿ S702

FIG. 7 receiving related information of a multi-card problem of a terminal sent by a core network, so as to determine a configuration for solving the multi-card problem according to the related information of the multi-card problem ⟿ S801 performing a corresponding configuration for the terminal according to the configuration ⟿ S802

FIG. 8

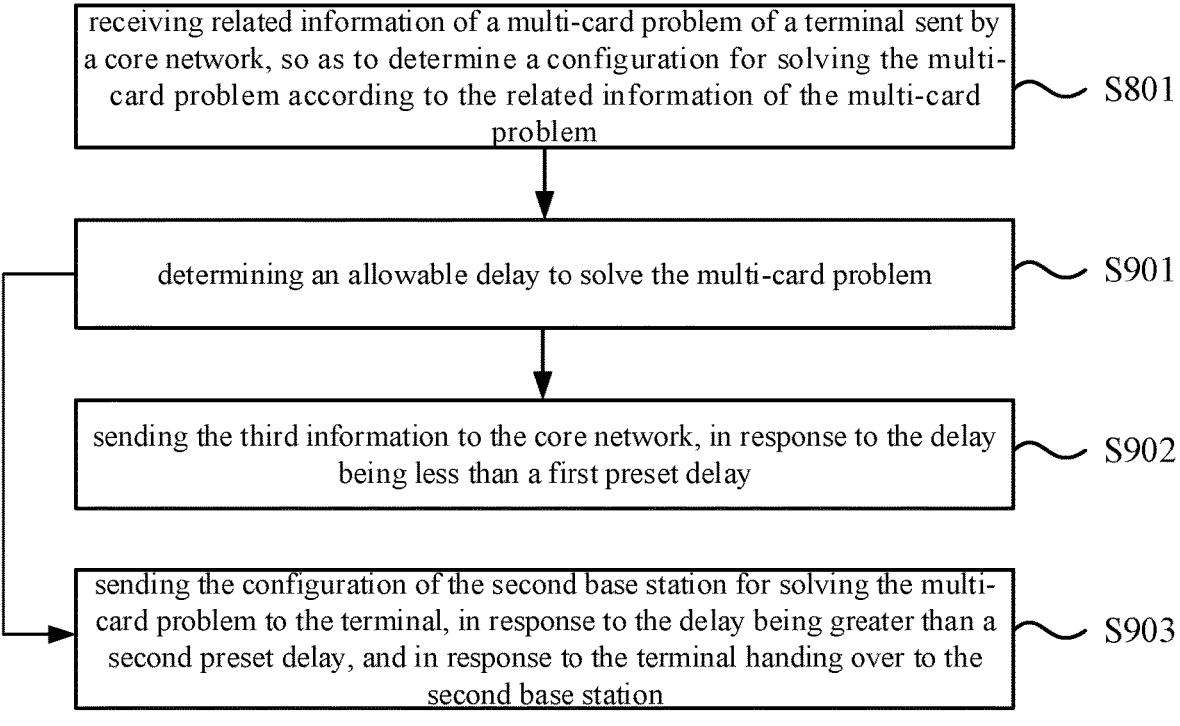

receiving related information of a multi-card problem of a terminal sent by a core network, so as to determine a configuration for solving the multi-card problem according to the related information of the multi-card problem — S801 determining an allowable delay to solve the multi-card problem — S901 sending the third information to the core network, in response to the delay being less than a first preset delay — S902 sending the configuration of the second base station for solving the multi-card problem to the terminal, in response to the delay being greater than a second preset delay, and in response to the terminal handing over to the second base station — S903

FIG. 9

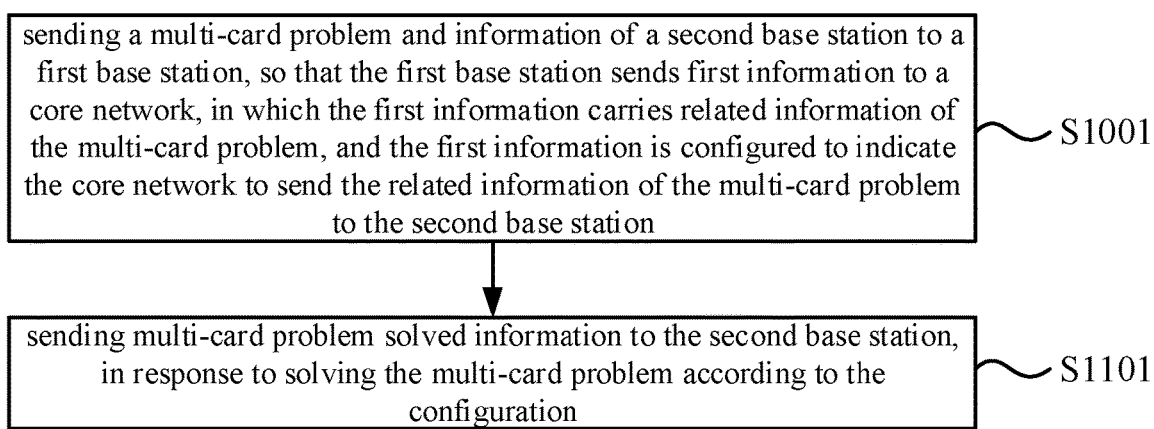

sending a multi-card problem and information of a second base station to a first base station, so that the first base station sends first information to a core network, in which the first information carries related information of the multi-card problem, and the first information is configured to indicate the core network to send the related information of the multi-card problem to the second base station — S1001

FIG. 10 sending a multi-card problem and information of a second base station to a first base station, so that the first base station sends first information to a core network, in which the first information carries related information of the multi-card problem, and the first information is configured to indicate the core network to send the related information of the multi-card problem to the second base station — S1001 sending multi-card problem solved information to the second base station, in response to solving the multi-card problem according to the configuration — S1101

FIG. 11

METHOD FOR SENDING INDICATION, METHOD FOR SENDING INFORMATION, AND METHOD FOR SOLVING MULTI-CARD PROBLEM

CROSS-REFERENCE TO RELATED APPLICATION

This application is a U.S. national phase application of International Patent Application No. PCT/CN2021/087891, filed on Apr. 16, 2021, the entire contents of which are incorporated herein by reference.

FIELD

The present disclosure relates to the field of communication technologies, and in particular to a method for sending an indication, a method for sending information, a method for solving a multi-card problem, an apparatus for sending an indication, an apparatus for sending information, an apparatus for solving a multi-card problem, a communication device, and a computer-readable storage medium.

BACKGROUND

In a multi-card terminal, multiple subscriber identity module (SIM) cards may be set, and the terminal may communicate via the multiple SIM cards. However, in a communication process, communication conflicts may occur between the multiple SIM cards, which affects the communication effect of the terminal.

SUMMARY

According to a first aspect of embodiments of the present disclosure, a method for sending an indication is provided. The method is applied to a first base station. The method includes sending first information to a core network, in response to receiving a multi-card problem of a terminal and determining to hand over the terminal to a second base station. The first information carries related information of the multi-card problem, and the first information is configured to instruct the core network to send the related information of the multi-card problem to the second base station.

According to a second aspect of embodiments of the present disclosure, a method for sending information is provided. The method is applied to a core network. The method includes receiving first information sent by a first base station, in which the first information carries related information of a multi-card problem of a terminal, and the first information is configured to instruct the core network to send the related information of the multi-card problem to a second base station, and sending the related information of the multi-card problem to the second base station.

According to a third aspect of embodiments of the present disclosure, a method for solving a multi-card problem is provided. The method is applied to a terminal. The method includes sending a multi-card problem and information of a second base station to a first base station, so that the first base station sends first information to a core network. The first information carries related information of the multi-card problem, and the first information is configured to instruct the core network to send the related information of the multi-card problem to the second base station.

BRIEF DESCRIPTION OF THE DRAWINGS

In order to illustrate the technical solutions in embodiments of the present disclosure more clearly, accompanying drawings to be used in the description of the embodiments will be briefly introduced below, and it is apparent that the accompanying drawings in the following description are merely some embodiments of the present disclosure. For those ordinarily skilled in the art, other drawings may also be obtained from these accompanying drawings without creative labor.

FIG. 1 is a schematic flow chart showing a method for sending an indication according to an embodiment of the present disclosure.

FIG. 2 is a schematic flow chart showing another method for sending an indication according to an embodiment of the present disclosure.

FIG. 3 is a schematic flow chart showing another method for sending an indication according to an embodiment of the present disclosure.

FIG. 4 is a schematic flow chart showing another method for sending an indication according to an embodiment of the present disclosure.

FIG. 5 is a schematic flow chart showing another method for sending an indication according to an embodiment of the present disclosure.

FIG. 6 is a schematic flow chart showing a method for sending information according to an embodiment of the present disclosure.

FIG. 7 is a schematic flow chart showing another method for sending information according to an embodiment of the present disclosure.

FIG. 8 is a schematic flow chart showing a method for solving a multi-card problem according to an embodiment of the present disclosure.

FIG. 9 is a schematic flow chart showing another method for solving a multi-card problem according to an embodiment of the present disclosure.

FIG. 10 is a schematic flow chart showing a method for solving a multi-card problem according to an embodiment of the present disclosure.

FIG. 11 is a schematic flow chart showing another method for solving a multi-card problem according to an embodiment of the present disclosure.

DETAILED DESCRIPTION

Figure 12:
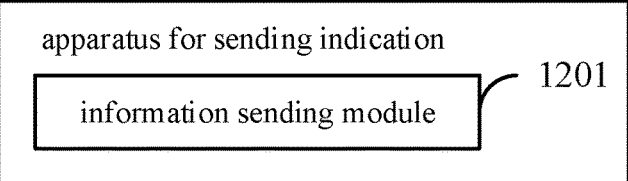
FIG. 12 is a block diagram showing an apparatus for sending an indication according to an embodiment of the present disclosure.

The technical solutions in embodiments of the present disclosure will be clearly and completely described below with reference to accompanying drawings in the embodiments of the present disclosure. Apparently, the described embodiments are only part of embodiments of the present disclosure, not all of the embodiments. Based on the embodiments in the present disclosure, all other embodiments obtained by those skilled in the art without creative labor shall fall within the protection scope of the present disclosure.

Terms used in the embodiments of the present disclosure are only for the purpose of describing specific embodiments, but should not be construed to limit the present disclosure. As used in the embodiments of the present disclosure and the appended claims, "a/an" and "the" in singular forms are intended to include plural forms, unless clearly indicated in the context otherwise. It should also be understood that the term "and/or" used herein represents and contains any one or all possible combinations of one or more associated listed items.

It is to be understood that, although terms such as "first", "second" and "third" may be used in embodiments of the present disclosure for describing various information, these information should not be limited by these terms. These terms are only used for distinguishing information of the same type from each other. For example, first information may also be referred to as second information, and similarly, second information may also be referred to as first information, without departing from the scope of the embodiments of the present disclosure. As used herein, the term "if" may be construed to mean "when" or "upon" or "in response to determining" depending on the context.

For the purpose of brevity and ease of understanding, the terms "greater than" or "less than", "higher than" or "lower than" are used herein when describing the relationship of magnitude. However, for those skilled in the art, it may be understood that the term "greater than" also covers the meaning of "greater than or equal to", and the term "less than" also covers the meaning of "less than or equal to"; the term "higher than" covers "higher than or equal to", and the term "lower than" also covers the meaning of "lower than or equal to".

In view of this, embodiments of the present disclosure provide a method for sending an indication, a method for sending information, a method for solving a multi-card problem, an apparatus for sending an indication, an apparatus for sending information, an apparatus for solving a multi-card problem, a communication device, and a computer-readable storage medium to solve technical problems in the related art.

FIG. 1 is a schematic flow chart showing a method for sending an indication according to an embodiment of the present disclosure. The method for sending the indication shown in the embodiment may be applied to a first base station. The first base station may communicate with a core network, and may also communicate with a terminal serving as a user equipment (UE). The core network may communicate with the first base station and a second base station other than the first base station.

The terminal includes, but is not limited to, a communication device, such as a mobile phone, a tablet computer, a wearable device, a sensor, an unmanned aerial vehicle, an Internet of Things device, and the like. The first base station and the second base station include, but are not limited to, a base station in a communication system, such as a 4G base station, a 5G base station, and a 6G base station. The core network includes, but is not limited to, a core network in a communication system, such as a 4G base station, a 5G base station, and a 6G base station.

As shown in FIG. 1, the method for sending the indication may include a step as follows.

In step S101, first information is sent to a core network, in response to receiving a multi-card problem of a terminal and determining to hand over the terminal to a second base station.

The first information carries related information of the multi-card problem, and the first information is configured to instruct the core network to send the related information of the multi-card problem to the second base station.

In an embodiment, the terminal may currently access the first base station, for example, residing in a cell corresponding to the first base station (for example, in an idle state or an inactive state), or establishing a connection with the first base station (for example, in a connected state).

The terminal, when determining that a multi-card problem exists (currently exists or is predicted to occur), may send the multi-card problem to the base station. After receiving the multi-card problem of the terminal, the base station may further determine a target base station to which the terminal needs to be handed over when the terminal needs to perform a cell handover (for example, a cell reselection). In the embodiment of the present disclosure, the target base station is referred to as the second base station.

After determining the second base station, the first base station may carry the related information of the multi-card problem in the first information and send it to the core network, so as to instruct the core network to send the related information of the multi-card problem to the second base station, thus solving the multi-card problem for the terminal.

For example, the second base station may wait until the terminal hands over to the second base station, and then solve the multi-card problem for the terminal. The second base station may also send a configuration for solving the multi-card problem to the core network, and the core network forwards it to the first base station, so that the first base station solves the multi-card problem for the terminal according to the configuration for solving the multi-card problem provided by the second base station.

According to embodiments of the present disclosure, the first base station may send the multi-card problem existing in the terminal to the second base station to which the terminal needs to be handed over via the core network in a process of the terminal handing over cells, so that the second base station may solve the multi-card problem for the terminal.

In an embodiment, the first base station may determine whether there exists an available inter-base station interface, such as an X2 interface or an Xn interface, with the second base station.

In response to determining that there exists an available inter-base station interface between the first base station and the second base station, the first base station may choose to send the related information of the multi-card problem directly to the second base station via the inter-base station interface, or still perform the above-mentioned step S101.

In response to determining that there is no available inter-base station interface between the first base station and the second base station, the first base station may perform the above-mentioned step S101. There are two cases that there is no inter-base station interface. One case is that there is no inter-base station interface between the first base station and the second base station, and the other case is that there is an inter-base station interface between the first base station and the second base station, but the interface is not available currently.

In an embodiment, the first base station may determine whether there exists a specified type of available inter-base station interface with the second base station.

In response to determining that there exists the specified type of available inter-base station interface between the first base station and the second base station, the first base station may choose to send the related information of the multi-card problem directly to the second base station via the inter-base station interface, or still perform the above-mentioned step S101.

In response to determining that there is no specified type of available inter-base station interface between the first base station and the second base station, the first base station may perform the above-mentioned step S101.

In an embodiment, when the first base station is a primary base station in dual connection, a type of the second base station may be determined. Embodiments of the present disclosure are illustrated below with reference to the case that the first base station is a 4G base station as an example.

In case that the second base station is a 4G base station, when there is an X2 interface between the first base station and the second base station, the first base station may choose to send the multi-card problem directly to the second base station, or perform the above-mentioned step S101. When there is no X2 interface between the first base station and the second base station, the above-mentioned step S101 may be performed.

In case that the second base station is a 5G base station, and the second base station is not a secondary base station of the first base station, when there is an Xn interface between the first base station and the second base station, the first base station may choose to send the multi-card problem directly to the second base station, or perform the above-mentioned step S101. When there is no Xn interface between the first base station and the second base station, the above-mentioned step S101 may be performed.

In case that the second base station is a 5G base station, and the second base station is a secondary base station of the first base station, even if the first base station is a 4G base station, resource coordination between the first base station and the second base station may also be performed via the X2 interface. Therefore, when there is an X2 interface between the first base station and the second base station, the first base station may choose to send the multi-card problem directly to the second base station (for example, carrying the multi-card problem via a signaling for resource coordination between the first base station and the second base station), or perform the above-mentioned step S101. When there is no X2 interface between the first base station and the second base station, the above-mentioned step S101 may be performed.

In an embodiment, multiple SIM cards may be set in the terminal. The multiple SIM cards at least include a first SIM card and a second SIM card. The multi-card problem of the terminal may be that a communication operation of the first SIM card conflicts with a communication operation of the second SIM card, for example, a communication operation between the first SIM card and the first base station conflicts with a communication operation between the second SIM card and the second base station.

The conflict between the communication operation of the first SIM card and the communication operation of the second SIM card includes, but is not limited to, the following situations. For example, the terminal uses the first SIM card to perform a communication operation in a first system (for example, a system where the first base station is located) and uses the second SIM card to perform a communication operation in a second system (a system where a base station other than the first base station is located).

When the terminal communicates with the first system, the terminal needs to detect the second system from time to time, for example, monitoring a paging, performing a measurement, reading a system message, etc. This may have an impact on the performance of the first system.

A paging timing is calculated according to a user equipment identifier. Since a multi-card terminal has multiple SIM cards, each SIM card has a corresponding user equipment identifier, and algorithms for calculating the paging timings are different, which may lead to overlap of paging timings calculated for the multiple SIM cards, thus causing a systematic paging collision.

When the terminal receives a paging message on the second system, it needs to decide whether it needs to respond to the paging, which is performed based on rules configured by the UE itself.

When the multi-card terminal decides to respond to the paging message of the second system, it needs to stop the communication operation currently being performed in the first system. In the absence of a suspension mechanism for the current activity, the UE will automatically disconnect the connection from the first system (for example, an unlimited resource control connection) and leave. Moreover, after the UE leaves, the first system will continue to page the UE, thus causing a waste of paging resources.

When the terminal reads the paging or measurement in the second system, it will cause a short interval of about 20 ms in the first system. For the first system, it is similar to experiencing a shadow fading, and since it occurs once per paging cycle, this may affect a power control and a link adaptation algorithm of the network, thus wasting resources of the first system.

When the terminal decides to hand over to a cell of the second system, it needs to read system information in the second system, which will cause a long interval of about 1 second in the first system. The first system will consider this as an error situation. It is not sure how the UE and the network will handle this situation at present.

The terminal may cause a longer interval of seconds in the first system when the second system performs a tracking area update. Therefore, the impact on the first system is greater.

The above-mentioned specific situations may be summarized as the following two situations: the first SIM card collides with the paging of the second SIM card; when using the first SIM card for communication, it needs to hand over to using the second SIM card for communication.

In an embodiment, when using the first SIM card for communication, it needs to hand over to using the second SIM card for communication, which may include, but not limited to, the communication operation of the first SIM card conflicting with the second SIM card monitoring a paging message; the communication operation of the first SIM card conflicting with the second SIM card responding to a paging message; the communication operation of the first SIM card conflicting with the second SIM card measuring a signal; the communication operation of the first SIM card conflicting with the second SIM card receiving system information; the communication operation of the first SIM card conflicting with the second SIM card performing a tracking area update.

In an embodiment, the related information of the multi-card problem includes at least one of: the multi-card problem, a recommended configuration for solving the multi-card problem.

The related information of the multi-card problem carried in the first information sent by the first base station to the core network may include the multi-card problem itself, for example, one or more of the above-mentioned types of multi-card problems. The related information of the multi-card problem may also include a recommended configuration for the multi-card problem determined by the first base station according to its own implementation. For example, the first base station may determine a historical configuration with which the multi-card problem has been successfully solved for the terminal in the past (which may be determined by the first base station itself or from other base stations), and take the historical configuration as the recommended configuration.

FIG. 2 is a schematic flow chart showing another method for sending an indication according to an embodiment of the present disclosure. As shown in FIG. 2, in some embodiments, the method further includes a step as follows.

In step S201, a measurement report sent by the terminal is received, and the measurement report carries the multi-card problem.

In an embodiment, when the terminal needs to hand over cells, the terminal may measure a cell currently located and a neighboring cell, generate a measurement report according to a measurement result, and then send the measurement report to the first base station. After receiving the measurement report, the first base station may determine the second base station to which the terminal needs to be handed over according to the measurement report.

The terminal may carry the multi-card problem via the measurement report and send it to the first base station. In this way, there is no need to use separate information to carry and report the multi-card problem, which is beneficial to save communication resources.

In an embodiment, the multi-card problem may be generated before the terminal needs to hand over the cells, and when the terminal needs to hand over the cells (a triggering reason is not the multi-card problem), the multi-card problem is carried in the measurement report and reported to the first base station.

In an embodiment, the multi-card problem may trigger the terminal to hand over the cells. For example, after the terminal generates the multi-card problem, and it is determined that the first base station where the terminal is located currently cannot solve the multi-card problem, a cell handover may be triggered, so as to access other base station to let other base station to solve the multi-card problem.

In an embodiment, the measurement report further carries at least one of: measurement results of capabilities of multiple base stations for solving the multi-card problem, monitoring results of signal qualities of multiple base stations.

In addition to the multi-card problem, the measurement report may also carry measurement results of signal qualities of multiple base stations (corresponding cells). When a base station may broadcast its capability to solve the multi-card problem, the terminal may also monitor the capability of the base station to solve the multi-card problem, and carry the monitoring result in the measurement report and report it to the first base station, so that the first base station may determine which base station has the capability to solve the multi-card problem reported by the terminal.

FIG. 3 is a schematic flow chart showing another method for sending an indication according to an embodiment of the present disclosure. As shown in FIG. 3, in some embodiments, the method further includes a step as follows.

In step S301, the second base station is determined from the multiple base stations according to the capabilities of the multiple base stations for solving the multi-card problem and/or the signal qualities of the multiple base stations.

In an embodiment, the first base station may determine the second base station from the multiple base stations merely according to the signal qualities of the multiple base stations in the measurement report. For example, a base station with a best signal quality may be selected as the second base station.

In an embodiment, the first base station may determine the second base station from the multiple base stations merely according to the capabilities of the multiple base stations for solving the multi-card problem in the measurement report. For example, a base station that is capable of solving all the multi-card problems reported by the terminal may be selected as the second base station.

In an embodiment, the first base station may also determine the second base station from the multiple base stations by comprehensively considering the capabilities of the multiple base stations for solving the multi-card problem and the signal quality in the measurement report.

For example, candidate base stations whose signal quality is greater than a quality threshold may be determined from the multiple base stations, and then a base station that is capable of solving all the multi-card problems reported by the terminal may be determined from the candidate base stations as the second base station.

For example, candidate base stations that are capable of solving all the multi-card problems reported by the terminal may be determined from the multiple base stations, and then a base station with a best signal quality may be determined from the candidate base stations as the second base station.

In case that in the multiple base stations, there is no candidate base station that is capable of solving all the multi-card problems reported by the terminal, target base stations that are capable of solving a specific multi-card problem in the multi-card problems reported by the terminal may be determined, the specific multi-card problem may refer to a multi-card problem that is not affected by the signal quality, and a base station with a best signal quality may be determined from the target base stations as the second base station. Based on this, although the target base station cannot solve all the multi-card problems, it may solve the multi-card problem that is not affected by the signal quality. Since the selected second base station is the base station with the best signal quality from the target base stations, the multi-card problem that is affected by the signal quality may also be alleviated to some extent after the terminal accesses the selected second base station.

FIG. 4 is a schematic flow chart showing another method for sending an indication according to an embodiment of the present disclosure. As shown in FIG. 4, in some embodiments, the measurement report includes indication information configured to instruct that the second base station is capable of solving the multi-card problem, and the method further includes a step as follows.

In step S401, the second base station is determined according to the indication information.

In an embodiment, the terminal may autonomously determine the second base station. For example, the terminal may determine a base station that is capable of solving all the multi-card problems reported by the terminal from the multiple base stations as the second base station, and then generate the indication information configured to indicate that the second base station is capable of solving the multi-card problem. For example, the indication information may include an identifier of the second base station. Then, the indication information is carried in the measurement report and is sent to the first base station, so that the first base station may determine the second base station directly according to the indication information.

In an embodiment, the first information is carried in a handover required signaling. Accordingly, a related signaling in a handover process may be directly used to carry the first information, rather than sending the first information separately, which is beneficial to saving communication resources.

In an embodiment, the first information is carried in a newly added information element (IE) of the handover required signaling, or carried in a source to target transparent container information element of the handover required signaling.

For example, the first information may be specifically carried in at least one of: a source NG-RAN node to target NG-RAN node transparent container IE, a source eNB to target eNB transparent container IE, a source RNC to target RNC transparent container IE.

FIG. 5 is a schematic flow chart showing another method for sending an indication according to an embodiment of the present disclosure. As shown in FIG. 5, in some embodiments, the method further includes steps as follows.

In step S501, a configuration for solving the multi-card problem is determined according to second information from the core network.

In step S502, a corresponding configuration is performed for the terminal according to the configuration.

In an embodiment, after receiving the first information, the core network may send the related information of the multi-card problem carried in the first information to the second base station, and the second base station may determine the configuration for solving the multi-card problem according to the related information of the multi-card problem, and then perform the corresponding configuration for the terminal based on the configuration, so as to solve the multi-card problem for the terminal.

The second base station may indirectly perform the corresponding configuration for the terminal. For example, the second base station sends the configuration to the core network, and then the core network carries the configuration in the second information and sends it to the first base station, so that the first base station may solve the multi-card problem for the terminal according to the configuration, for example, sending the configuration to the terminal.

The second base station may indirectly perform the corresponding configuration for the terminal. For example, after the terminal hands over to the second base station, the second base station sends the determined configuration to the terminal.

It is to be noted that, in all embodiments of the present disclosure, the configuration for solving the multi-card problem, such as the configuration determined by the second base station, the recommended configuration for solving the multi-card problem in the related information of the multi-card problem, etc., may be different for different multi-card problems. Performing the corresponding configuration for the terminal according to the configuration for solving the multi-card problem may change time-frequency resources for the terminal to perform conflict operations. For example, in a case where the multi-card problem is that a communication operation between the first SIM card and the first base station conflicts with the second SIM card monitoring a paging message of the second base station (or other base stations), the configuration for solving the multi-card problem may be to temporarily suspend the time-frequency resource for the communication operation between the first SIM card and the first base station, and give priority to the second SIM card to monitor the paging message.

In an embodiment, the second information is carried in a handover command signaling.

In an embodiment, the second information is carried in a newly added information element of the handover command signaling, or carried in a target to source transparent container information element of the handover command signaling.

In an embodiment, the first base station may receive the handover command signaling sent by the core network and acquire the second information from the handover command signaling. For example, the second information may be acquired from the newly added information element of the handover command signaling, or the second information may be acquired from the target to source transparent container information element of the handover command signaling.

FIG. 6 is a schematic flow chart showing a method for sending information according to an embodiment of the present disclosure. The method for sending the information shown in the embodiment may be applied to a core network. The core network may communicate with a first base station, a first base station, and a terminal serving as a user equipment (UE).

The terminal includes, but is not limited to, a communication device, such as a mobile phone, a tablet computer, a wearable device, a sensor, an unmanned aerial vehicle, an Internet of Things device, and the like. The first base station and the second base station include, but are not limited to, a base station in a communication system, such as a 4G base station, a 5G base station, and a 6G base station. The core network includes, but is not limited to, a core network in a communication system, such as a 4G base station, a 5G base station, and a 6G base station.

As shown in FIG. 6, the method for sending the information may include steps as follows.

In step S601, first information sent by a first base station is received. The first information carries related information of a multi-card problem of a terminal, and the first information is configured to instruct the core network to send the related information of the multi-card problem to a second base station.

In step S602, the related information of the multi-card problem is sent to the second base station.

In an embodiment, the terminal may currently access the first base station, for example, residing in a cell corresponding to the first base station (for example, in an idle state or an inactive state), or establishing a connection with the first base station (for example, in a connected state).

The terminal, when determining that a multi-card problem exists (currently exists or is predicted to occur), may send the multi-card problem to the base station. After receiving the multi-card problem of the terminal, the base station may further determine a target base station to which the terminal needs to be handed over when the terminal needs to perform a cell handover (for example, a cell reselection). In the embodiment of the present disclosure, the target base station is referred to as the second base station.

After determining the second base station, the first base station may carry the related information of the multi-card problem in the first information and send it to the core network, so as to instruct the core network to send the related information of the multi-card problem to the second base station, thus solving the multi-card problem for the terminal.

For example, the second base station may wait until the terminal hands over to the second base station, and then solve the multi-card problem for the terminal. The second base station may also send a configuration for solving the multi-card problem to the core network, and the core network forwards it to the first base station, so that the first base station solves the multi-card problem for the terminal according to the configuration for solving the multi-card problem provided by the second base station.

According to embodiments of the present disclosure, the first base station may send the multi-card problem existing in the terminal to the second base station to which the terminal needs to be handed over via the core network in a process of the terminal handing over cells, so that the second base station may solve the multi-card problem for the terminal.

In an embodiment, the related information of the multi-card problem includes at least one of: the multi-card problem, a recommended configuration for solving the multi-card problem.

The related information of the multi-card problem carried in the first information sent by the first base station to the core network may include the multi-card problem itself, for example, one or more of the above-mentioned types of multi-card problems. The related information of the multi-card problem may also include a recommended configuration for the multi-card problem determined by the first base station according to its own implementation. For example, the first base station may determine a historical configuration with which the multi-card problem has been successfully solved for the terminal in the past (which may be determined by the first base station itself or from other base stations), and take the historical configuration as the recommended configuration.

In an embodiment, the method further includes sending a recommended configuration of the core network for solving the multi-card problem to the second base station (which may be the same as or different from the recommended configuration for the multi-card problem determined by the first base station according to its own implementation).

The core network may also determine a recommended configuration for the multi-card problem according to its own implementation and send it to the second base station. For example, the core network may determine a historical configuration with which the multi-card problem has been successfully solved for the terminal in the process of solving the multi-card problem for the terminal in the past, and then take this historical configuration as the recommended configuration.

In an embodiment, sending the related information of the multi-card problem to the second base station includes carrying the related information of the multi-card problem via a handover request signaling and sending it to the second base station.

Accordingly, a related signaling in a handover process may be directly used to carry the related information of the multi-card problem and send it to the second base station, rather than sending the related information of the multi-card problem to the second base station separately, which is beneficial to saving communication resources.

In an embodiment, sending the related information of the multi-card problem to the second base station includes transparently transmitting a source to target transparent container information element to the second base station, in response to the first information being carried in the source to target transparent container information element of a handover required signaling.

When the first information is carried in the source to target transparent container information element, the core network may transparently transmit the source to target transparent container information element to the second base station directly, so that the second base station receives the first information. However, when the first information is carried in other information elements of the handover required signaling, the core network may acquire the related information of the multi-card problem from the first information, and then carry the related information of the multi-card problem in the newly added information element of the handover request signaling and send it to the second base station.

FIG. 7 is a schematic flow chart showing another method for sending information according to an embodiment of the present disclosure. As shown in FIG. 7, the method further includes steps as follows.

In step S701, third information sent by the second base station is received. The third information carries a configuration of the second base station for solving the multi-card problem.

In step S702, the configuration of the second base station for solving the multi-card problem is carried in the second information and sent it to the first base station.

In an embodiment, the second base station may determine the configuration for solving the multi-card problem according to the related information of the multi-card problem, and then solve the multi-card problem for the terminal based on the configuration. When the second base station solves the multi-card problem for the terminal based on a determined configuration, the second base station may carry the configuration in the third information and send it to the core network, and then the core network carries the configuration in the second information and sends it to the first base station, so that the first base station may solve the multi-card problem for the terminal according to the configuration, for example, sending the configuration to the terminal.

In an embodiment, carrying the configuration of the second base station for solving the multi-card problem in the second information and sending it to the first base station includes: transparently transmitting a target to source transparent container information element to the first base station, in response to the third information being carried in the target to source transparent container information element of a handover request acknowledgement signaling; or carrying the configuration of the second base station for solving the multi-card problem via a handover command signaling and sending it to the first base station, in response to the third information being carried in the handover request acknowledgement signaling and being not carried in the target to source transparent container information element.

When the third information is carried in the target to source transparent container information element, the core network may transparently transmit the target to source transparent container information element to the first base station directly, so that the first base station receives the configuration for solving the multi-card problem. When the third information is carried in other information elements of the handover request acknowledgement, the core network may acquire the configuration for solving the multi-card problem from the third information, and then carry the configuration for solving the multi-card problem in the newly added information element of the handover command signaling and send it to the first base station.

FIG. 8 is a schematic flow chart showing a method for solving a multi-card problem according to an embodiment of the present disclosure. The method for solving the multi-card problem shown in the embodiment may be applied to a second base station. The second base station may communicate with a core network, a first base station, and a terminal serving as a user equipment (UE).

The terminal includes, but is not limited to, a communication device, such as a mobile phone, a tablet computer, a wearable device, a sensor, an unmanned aerial vehicle, an Internet of Things device, and the like. The first base station and the second base station include, but are not limited to, a base station in a communication system, such as a 4G base station, a 5G base station, and a 6G base station. The core network includes, but is not limited to, a core network in a communication system, such as a 4G base station, a 5G base station, and a 6G base station.

As shown in FIG. 8, the method for solving the multi-card problem may include steps as follows.

In step S801, related information of a multi-card problem of a terminal sent by a core network is received, so as to determine a configuration for solving the multi-card problem according to the related information of the multi-card problem.

In step S802, a corresponding configuration is performed for the terminal according to the configuration.

The first information carries the related information of the multi-card problem, and the first information is configured to instruct the core network to send the related information of the multi-card problem to a second base station.

In an embodiment, the terminal may currently access the first base station, for example, residing in a cell corresponding to the first base station (for example, in an idle state or an inactive state), or establishing a connection with the first base station (for example, in a connected state).

The terminal, when determining that a multi-card problem exists (currently exists or is predicted to occur), may send the multi-card problem to the base station. After receiving the multi-card problem of the terminal, the base station may further determine a target base station to which the terminal needs to be handed over when the terminal needs to perform a cell handover (for example, a cell reselection). In the embodiment of the present disclosure, the target base station is referred to as the second base station.

After determining the second base station, the first base station may carry the related information of the multi-card problem in the first information and send it to the core network, so as to instruct the core network to send the related information of the multi-card problem to the second base station. After receiving the related information of the multi-card problem, the second base station may determine the configuration for solving the multi-card problem according to the related information of the multi-card problem, and then perform the corresponding configuration for the terminal according to the configuration, so as to solve the multi-card problem for the terminal.

Accordingly, the second base station may determine the multi-card problem that the terminal needs to solve in a process of the terminal handing over cells, so as to solve the multi-card problem for the terminal.

In an embodiment, performing the corresponding configuration for the terminal according to the configuration includes: sending third information to the core network, in which the third information carries a configuration of the second base station for solving the multi-card problem, and/or sending the configuration of the second base station for solving the multi-card problem to the terminal, in response to the terminal handing over to the second base station. In an embodiment, the second base station may indirectly perform the corresponding configuration for the terminal. For example, the second base station carries the configuration for solving the multi-card problem in the third information and sends it to the core network, and then the core network forwards it to the first base station, so that the first base station solves the multi-card problem for the terminal according to the configuration for solving the multi-card problem provided by the second base station.

In an embodiment, the second base station may indirectly perform the corresponding configuration for the terminal. For example, after the terminal hands over to the second base station, the configuration for solving the multi-card problem is sent to the terminal, so as to solve the multi-card problem for the terminal, for example, the configuration for solving the multi-card problem is carried in an RRC Reconfiguration signaling or an RRC Connection Reconfiguration signaling and sent to the terminal.

In an embodiment, the third information is carried in a newly added information element of a handover request acknowledgement signaling, or carried in a target to source transparent container information element of the handover request acknowledgement signaling.

FIG. 9 is a schematic flow chart showing another method for solving a multi-card problem according to an embodiment of the present disclosure. As shown in FIG. 9, performing the corresponding configuration for the terminal according to the configuration includes steps as follows.

In step S901, an allowable delay to solve the multi-card problem is determined.

In step S902, the third information is sent to the core network, in response to the delay being less than a first preset delay.

In step S903, the configuration of the second base station for solving the multi-card problem is sent to the terminal, in response to the delay being greater than a second preset delay, and in response to the terminal handing over to the second base station.

The second preset delay is greater than or equal to the first preset delay.

In an embodiment, after receiving the related information of the multi-card problem sent by the core network, the second base station may choose to perform the configuration indirectly, for example, sending the configuration for solving the multi-card problem to the first base station via the core network. Alternatively, the second base station may choose to perform the configuration directly, for example, after the terminal hands over to the second base station, the second base station solves the multi-card problem for the terminal based on the configuration. However, probably, a long time needs to wait for the terminal to hand over to the second base station, which may easily cause a large delay, and it may be difficult to meet requirements of services with a low allowable delay.

Based on this, after receiving the related information of the multi-card problem, the second base station may determine the allowable delay of the multi-card problem. For example, the related information caries a service corresponding to the multi-card problem.

For example, when a communication operation being performed by the first SIM card conflicts with a communication operation required to be performed by the second SIM card, the service corresponding to the multi-card problem may be a service corresponding to the communication operation required to be performed by the second SIM card, and the allowable delay of the multi-card problem is an allowable delay of the service corresponding to the multi-card problem.

In case that the allowable delay of the service is relatively low, for example, less than the first preset delay, the third information carrying the configuration for solving the multi-card problem may be directly sent to the core network, so that the core network sends the configuration to the first base station as soon as possible, and the first base station may solve the multi-card problem for the terminal as soon as possible, so that the multi-card problem may be solved within the range of the first preset delay, and the service corresponding to the multi-card problem may be performed smoothly.

In case that the allowable delay of the service is relatively low, for example, greater than the first preset delay, it is possible to wait until the terminal hands over to the second base station, and then the configuration of the second base station for solving the multi-card problem is sent to the terminal. Accordingly, it is not necessary to forward the configuration to the first base station via the core network, which is beneficial to save communication resources.

FIG. 10 is a schematic flow chart showing a method for solving a multi-card problem according to an embodiment of the present disclosure. The method for solving the multi-card problem shown in the embodiment may be applied to a terminal. The terminal may be served as a user equipment (UE) to communicate with a first base station, a second base station, and a core network.

The terminal includes, but is not limited to, a communication device, such as a mobile phone, a tablet computer, a wearable device, a sensor, an unmanned aerial vehicle, an Internet of Things device, and the like. The first base station and the second base station include, but are not limited to, a base station in a communication system, such as a 4G base station, a 5G base station, and a 6G base station. The core network includes, but is not limited to, a core network in a communication system, such as a 4G base station, a 5G base station, and a 6G base station.

As shown in FIG. 10, the method for solving the multi-card problem may include a step as follows.

In step S1001, a multi-card problem and information of a second base station are sent to a first base station, so that the first base station sends first information to a core network.

The first information carries related information of the multi-card problem, and the first information is configured to instruct the core network to send the related information of the multi-card problem to the second base station.

In an embodiment, the terminal may currently access the first base station, for example, residing in a cell corresponding to the first base station (for example, in an idle state or an inactive state), or establishing a connection with the first base station (for example, in a connected state).

The terminal, when determining that a multi-card problem exists (currently exists or is predicted to occur), may send the multi-card problem and the information of the second base station to the base station. After receiving the multi-card problem of the terminal and the information of the second base station, the base station may determine that the related information of the multi-card problem needs to be sent to the second base station.

The first base station may carry the related information of the multi-card problem in the first information and send it to the core network, so as to instruct the core network to send the related information of the multi-card problem to the second base station, so as to solve the multi-card problem for the terminal.

For example, the second base station may wait until the terminal hands over to the second base station, and then solve the multi-card problem for the terminal. The second base station may also send the configuration for solving the multi-card problem to the core network, and the core network forwards it to the first base station, so that the first base station solves the multi-card problem for the terminal according to the configuration for solving the multi-card problem provided by the second base station.

According to embodiments of the present disclosure, the first base station may determine the multi-card problem that the terminal needs to solve and need to send the related information of the multi-card problem to the second base station, and may send the related information of the multi-card problem to the second base station via the core network, so that the second base station solves the multi-card problem for the terminal.

In an embodiment, sending the information of the second base station to the first base station includes sending a measurement report to the first base station. The measurement report at least includes a measurement result of the second base station.

In an embodiment, when the terminal needs to hand over cells, the terminal may measure a cell currently located and a neighboring cell, generate a measurement report according to a measurement result, and then send the measurement report to the first base station. After receiving the measurement report, the first base station may determine the second base station to which the terminal needs to be handed over according to the measurement report.

The terminal may carry the multi-card problem via the measurement report and send it to the first base station. In this way, there is no need to use separate information to carry and report the multi-card problem, which is beneficial to save communication resources.

In an embodiment, the multi-card problem may be generated before the terminal needs to hand over the cells, and when the terminal needs to hand over the cells (a triggering reason is not the multi-card problem), the multi-card problem is carried in the measurement report and reported to the first base station.

In an embodiment, the multi-card problem may trigger the terminal to hand over the cells. For example, after the terminal generates the multi-card problem, and it is determined that the first base station where the terminal is located currently cannot solve the multi-card problem, a cell handover may be triggered, so as to access other base station to let other base station to solve the multi-card problem.

In an embodiment, the measurement result of the second base station includes at least one of: a measurement result of a capability of the second base station for solving the multi-card problem, a measurement result of a signal quality of the second base station.

In addition to the multi-card problem, the measurement report may also carry measurement results of signal qualities of multiple base stations (corresponding cells). When a base station may broadcast its capability to solve the multi-card problem, the terminal may also monitor the capability of the base station to solve the multi-card problem, and carry the monitoring result in the measurement report and report it to the first base station, so that the first base station may determine which base station has the capability to solve the multi-card problem reported by the terminal.

In an embodiment, the method further includes: receiving a configuration sent by the second base station for solving the multi-card problem, and solving the multi-card problem according to the configuration.

In an embodiment, the terminal may directly or indirectly receive the configuration for solving the multi-card problem from the second base station, and then solve the multi-card problem based on the configuration. For example, according to the configuration for solving the multi-card problem, a time-frequency resource for a communication operation between the first SIM card and the first base station may be temporarily suspended, so as to give priority to the second SIM card to monitor the paging message.

In an embodiment, receiving the configuration sent by the second base station for solving the multi-card problem includes: receiving the configuration sent by the first base station. The configuration is sent by the second base station to the core network and sent by the core network to the first base station.

In an embodiment, the second base station may carry the configuration for solving the multi-card problem in the third information and send it to the core network, and the core network forwards it to the first base station, so that the first base station sends the configuration for solving the multi-card problem provided by the second base station to the terminal, and then the terminal solves the multi-card problem based on the configuration.

In an embodiment, receiving the configuration sent by the second base station for solving the multi-card problem includes: receiving the configuration sent by the second base station, in response to handing over to the second base station.

In an embodiment, after handing over to the second base station, the terminal may directly or indirectly receive the configuration for solving the multi-card problem from the second base station, and solve the multi-card problem based on the configuration.

FIG. 11 is a schematic flow chart showing another method for solving a multi-card problem according to an embodiment of the present disclosure. As shown in FIG. 11, the method further includes a step as follows.

In step S1101, multi-card problem solved information is sent to the second base station, in response to solving the multi-card problem according to the configuration.

In an embodiment, after successfully solving the multi-card problem according to the configuration for solving the multi-card problem provided by the second base station, the terminal may send the multi-card problem solved information to the second base station, to inform the second base station that the terminal has successfully solved the multi-card problem according to the configuration provided by the second base station, so that the second base station does not need to repeatedly send the configuration for the terminal. Accordingly, in case that the second base station does not receive the multi-card problem solved information within a period of time after sending the configuration, or receives information that the multi-card problem has not been solved, the second base station may send the configuration to the terminal again, or determine a new configuration and send it to the terminal, so as to solve the multi-card problem smoothly.

Corresponding to the above-mentioned embodiments of the method for sending the indication, the method for sending the information, and the method for solving the multi-card problem, the present disclosure also provides embodiments of an apparatus for sending an indication, an apparatus for sending information, and an apparatus for solving a multi-card problem.

FIG. 12 is a schematic block diagram showing an apparatus for sending an indication according to an embodiment of the present disclosure. The apparatus for sending the indication shown in the embodiment may be applied to a first base station. The first base station may communicate with a core network, and may also communicate with a terminal serving as a user equipment (UE). The core network may communicate with the first base station and a second base station other than the first base station.

The terminal includes, but is not limited to, a communication device, such as a mobile phone, a tablet computer, a wearable device, a sensor, an unmanned aerial vehicle, an Internet of Things device, and the like. The first base station and the second base station include, but are not limited to, a base station in a communication system, such as a 4G base station, a 5G base station, and a 6G base station. The core network includes, but is not limited to, a core network in a communication system, such as a 4G base station, a 5G base station, and a 6G base station.

As shown in FIG. 12, the apparatus for sending the indication may include an information sending module 1201.

The information sending module 1201 is configured to send first information to a core network, in response to receiving a multi-card problem of a terminal and determining to hand over the terminal to a second base station. The first information carries related information of the multi-card problem, and the first information is configured to instruct the core network to send the related information of the multi-card problem to the second base station.

In an embodiment, the related information of the multi-card problem includes at least one of: the multi-card problem, a recommended configuration for solving the multi-card problem.

Figure 13:
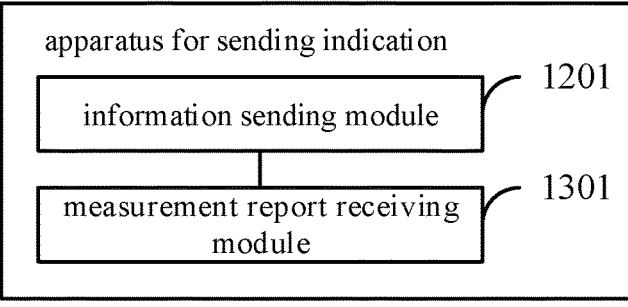
FIG. 13 is a block diagram showing another apparatus for sending an indication according to an embodiment of the present disclosure.

FIG. 13 is a schematic block diagram showing another apparatus for sending an indication according to an embodiment of the present disclosure. As shown in FIG. 13, the apparatus further includes a measurement report receiving module 1301.

The measurement report receiving module 1301 is configured to receive a measurement report sent by the terminal. The measurement report carries the multi-card problem.

In an embodiment, the measurement report further carries at least one of: measurement results of capabilities of multiple base stations for solving the multi-card problem, monitoring results of signal qualities of multiple base stations.

Figure 14:
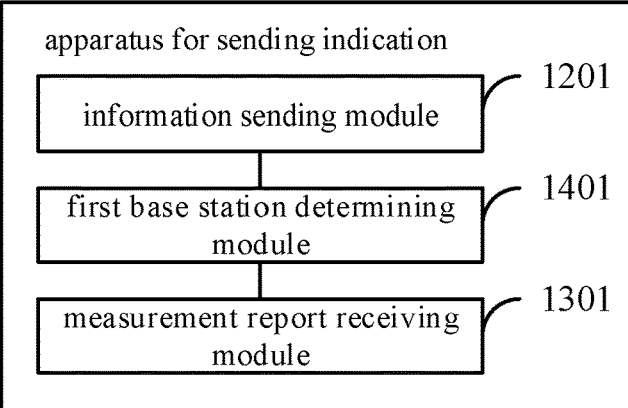
FIG. 14 is a block diagram showing another apparatus for sending an indication according to an embodiment of the present disclosure.

FIG. 14 is a schematic block diagram showing another apparatus for sending an indication according to an embodiment of the present disclosure. As shown in FIG. 14, the apparatus further includes a first base station determining module 1401.

The first base station determining module 1401 is configured to determine the second base station from the multiple base stations according to the capabilities of the multiple base stations for solving the multi-card problem and/or the signal qualities of the multiple base stations.

Figure 15:
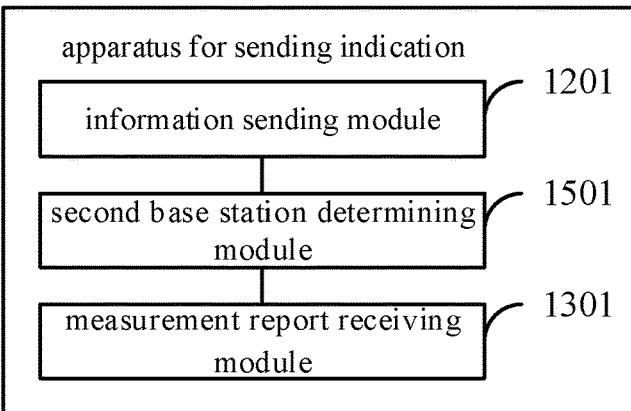
FIG. 15 is a schematic block diagram showing another apparatus for sending an indication according to an embodiment of the present disclosure.

FIG. 15 is a schematic block diagram showing another apparatus for sending an indication according to an embodiment of the present disclosure. As shown in FIG. 15, the measurement report includes indication information configured to indicate that the second base station is capable of solving the multi-card problem, and the apparatus further includes a second base station determining module 1501.

The second base station determining module 1501 is configured to determine the second base station according to the indication information.

In an embodiment, the first information is carried in a handover required signaling.

In an embodiment, the first information is carried in a newly added information element of the handover required signaling, or carried in a source to target transparent container information element of the handover required signaling.

Figure 16:
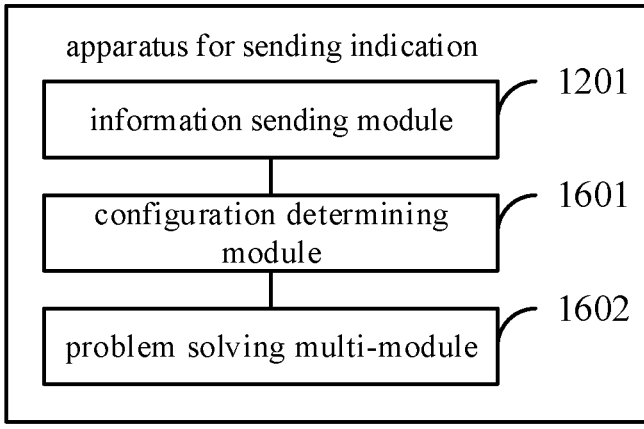
FIG. 16 is a schematic block diagram showing another apparatus for sending an indication according to an embodiment of the present disclosure.

FIG. 16 is a schematic block diagram showing another apparatus for sending an indication according to an embodiment of the present disclosure. As shown in FIG. 16, the apparatus further includes a configuration determining module 1601 and a problem solving multi-module 1602.

The configuration determining module 1601 is configured to determine a configuration for solving the multi-card problem according to the second information from the core network.

The problem solving multi-module 1602 is configured to perform a corresponding configuration for the terminal according to the configuration.

In an embodiment, the second information is carried in a handover command signaling.

In an embodiment, the second information is carried in a newly added information element of the handover command signaling, or carried in a target to source transparent container information element of the handover command signaling.

In an embodiment, the information sending module is configured to send the first information to the core network, in response to determining that no inter-base station interface is available between the first base station and the second base station.

Figure 17:
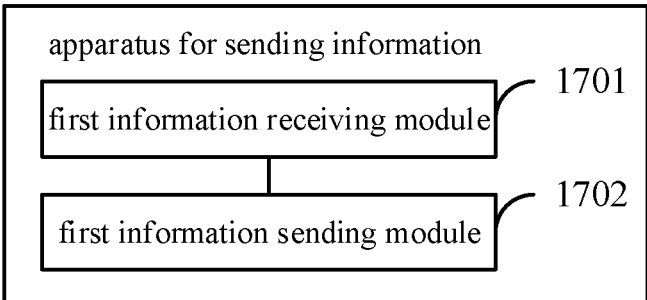
FIG. 17 is a schematic block diagram showing an apparatus for sending information according to an embodiment of the present disclosure.

FIG. 17 is a schematic block diagram showing an apparatus for sending information according to an embodiment of the present disclosure. The apparatus for sending the information shown in the embodiment may be applied to a core network. The core network may communicate with a first base station, a first base station, and a terminal serving as a user equipment (UE).

The terminal includes, but is not limited to, a communication device, such as a mobile phone, a tablet computer, a wearable device, a sensor, an unmanned aerial vehicle, an Internet of Things device, and the like. The first base station and the second base station include, but are not limited to, a base station in a communication system, such as a 4G base station, a 5G base station, and a 6G base station. The core network includes, but is not limited to, a core network in a communication system, such as a 4G base station, a 5G base station, and a 6G base station.

As shown in FIG. 17, the apparatus for sending the information may include a first information receiving module 1701 and a first information sending module 1702.

The first information receiving module 1701 is configured to receive first information sent by a first base station. The first information carries related information of a multi-card problem of a terminal, and the first information is configured to instruct the core network to send the related information of the multi-card problem to a second base station.

The first information sending module 1702 is configured to send the related information of the multi-card problem to the second base station.

In an embodiment, the related information of the multi-card problem includes at least one of: the multi-card problem, a recommended configuration for solving the multi-card problem.

Figure 18:
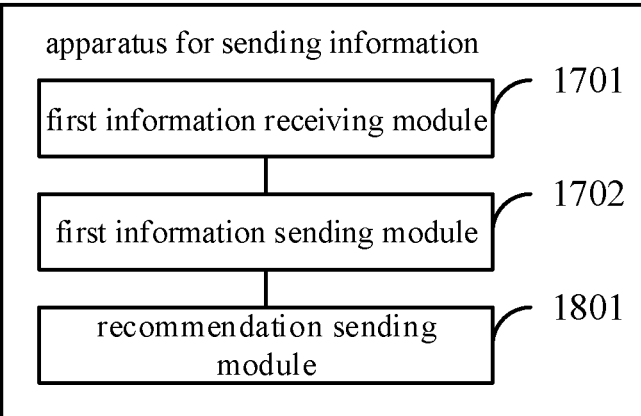
FIG. 18 is a schematic block diagram showing another apparatus for sending information according to an embodiment of the present disclosure.

FIG. 18 is a schematic block diagram showing another apparatus for sending information according to an embodiment of the present disclosure. As shown in FIG. 18, the apparatus further includes a recommendation sending module 1801.

The recommendation sending module 1801 is configured to send a recommended configuration of the core network for solving the multi-card problem to the second base station.

In an embodiment, the first information sending module is configured to carry the related information of the multi-card problem via a handover request signaling and send it to the second base station.

In an embodiment, the first information sending module is configured to transparently transmit a source to target transparent container information element to the second base station, in response to the first information being carried in the source to target transparent container information element of a handover required signaling.

Figure 19:
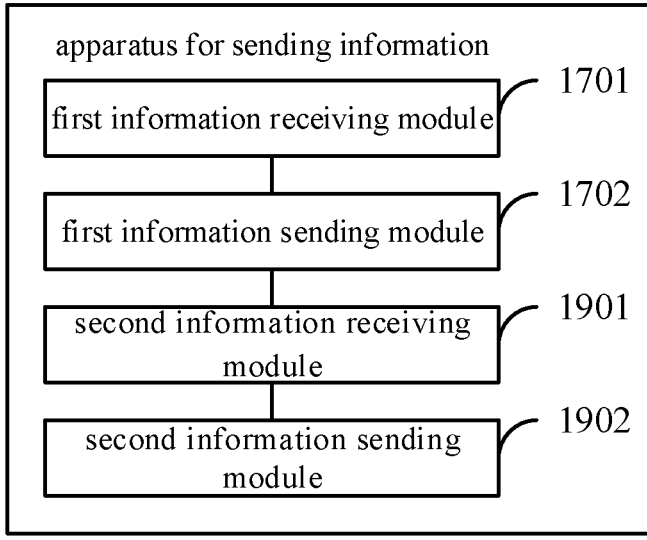
FIG. 19 is a schematic block diagram showing another apparatus for sending information according to an embodiment of the present disclosure.

FIG. 19 is a schematic block diagram showing another apparatus for sending information according to an embodiment of the present disclosure. As shown in FIG. 19, the apparatus further includes a second information receiving module 1901 and a second information sending module 1902.

The second information receiving module 1901 is configured to receive third information sent by the second base station. The third information carries a configuration of the second base station for solving the multi-card problem.

The second information sending module 1902 is configured to carry the configuration of the second base station for solving the multi-card problem in the second information and send it to the first base station.

In an embodiment, the second information sending module is configured to transparently transmit a target to source transparent container information element to the first base station, in response to the third information being carried in the target to source transparent container information element of a handover request acknowledgement signaling, and configured to carry the configuration of the second base station for solving the multi-card problem via a handover command signaling and send it to the first base station, in response to the third information being carried in a handover request acknowledgement signaling and being not carried in the target to source transparent container information element.

Figure 20:
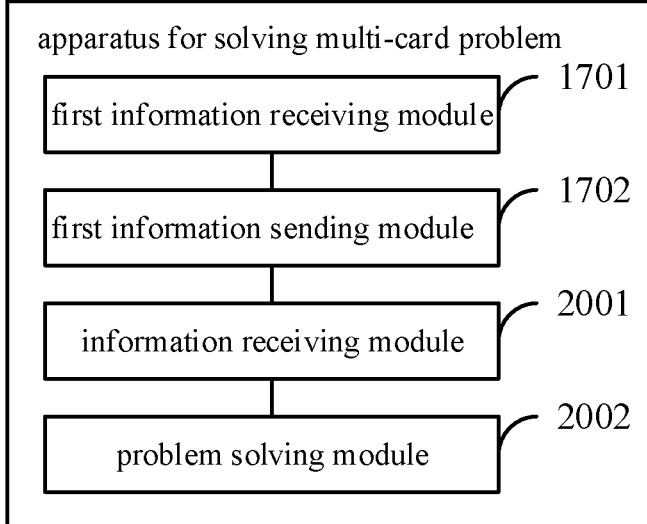
FIG. 20 is a schematic block diagram showing an apparatus for solving a multi-card problem according to an embodiment of the present disclosure.

FIG. 20 is a schematic block diagram showing an apparatus for solving a multi-card problem according to an embodiment of the present disclosure. The apparatus for solving the multi-card problem shown in the embodiment may be applied to a second base station. The second base station may communicate with a core network, a first base station, and a terminal serving as a user equipment (UE).

The terminal includes, but is not limited to, a communication device, such as a mobile phone, a tablet computer, a wearable device, a sensor, an unmanned aerial vehicle, an Internet of Things device, and the like. The first base station and the second base station include, but are not limited to, a base station in a communication system, such as a 4G base station, a 5G base station, and a 6G base station. The core network includes, but is not limited to, a core network in a communication system, such as a 4G base station, a 5G base station, and a 6G base station.

As shown in FIG. 20, the apparatus for solving the multi-card problem may include an information receiving module 2001 and a problem solving module 2002.

The information receiving module 2001 is configured to receive related information of a multi-card problem of a terminal sent by a core network.

The problem solving module 2002 is configured to perform a corresponding configuration for the terminal according to a configuration.

In an embodiment, the problem solving module is configured to send third information to the core network, in which the third information carries a configuration of the second base station for solving the multi-card problem, and/or send the configuration of the second base station for solving the multi-card problem to the terminal, in response to the terminal handing over to the second base station.

In an embodiment, the third information is carried in a newly added information element of a handover request acknowledgement signaling, or carried in a target to source transparent container information element of the handover request acknowledgement signaling.

In an embodiment, the problem solving module is configured to determine an allowable delay to solve the multi-card problem, send the third information to the core network, in response to the delay being less than a first preset delay, and send the configuration of the second base station for solving the multi-card problem to the terminal, in response to the delay being greater than a second preset delay, and in response to the terminal handing over to the second base station.

The second preset delay is greater than or equal to the first preset delay.

Figure 21:
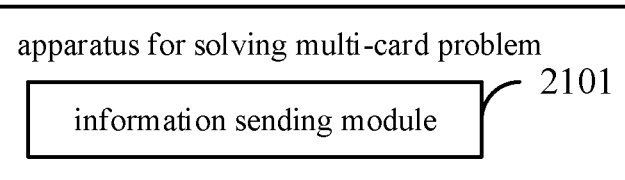
FIG. 21 is a schematic block diagram showing an apparatus for solving a multi-card problem according to an embodiment of the present disclosure.

FIG. 21 is a schematic block diagram showing an apparatus for solving a multi-card problem according to an embodiment of the present disclosure. The apparatus for solving the multi-card problem shown in the embodiment may be applied to a terminal. The terminal may be served as a user equipment (UE) to communicate with a first base station, and to communicate with a second base station and a core network.

The terminal includes, but is not limited to, a communication device, such as a mobile phone, a tablet computer, a wearable device, a sensor, an unmanned aerial vehicle, an Internet of Things device, and the like. The first base station and the second base station include, but are not limited to, a base station in a communication system, such as a 4G base station, a 5G base station, and a 6G base station. The core network includes, but is not limited to, a core network in a communication system, such as a 4G base station, a 5G base station, and a 6G base station.

As shown in FIG. 21, the apparatus for solving the multi-card problem may include an information sending module 2101.

The information sending module 2101 is configured to send a multi-card problem and information of a second base station to a first base station, so that the first base station sends first information to a core network.

The first information carries related information of the multi-card problem, and the first information is configured to instruct the core network to send the related information of the multi-card problem to the second base station.

In an embodiment, the information sending module is configured to send a measurement report to the first base station. The measurement report at least includes a measurement result of the second base station.

In an embodiment, the measurement result of the second base station includes at least one of: a measurement result of a capability of the second base station for solving the multi-card problem, a measurement result of a signal quality of the second base station.

Figure 22:
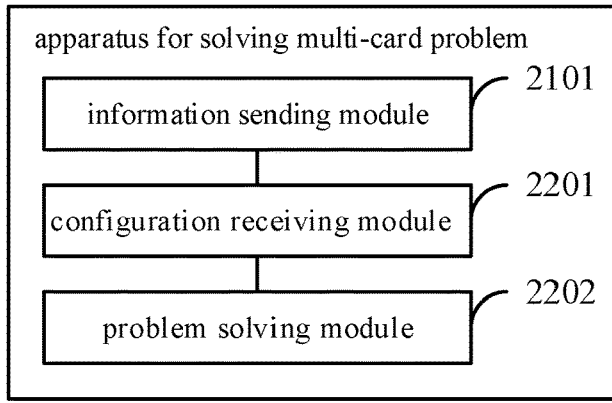
FIG. 22 is a schematic block diagram showing another apparatus for solving a multi-card problem according to an embodiment of the present disclosure.

FIG. 22 is a schematic block diagram showing another apparatus for solving a multi-card problem according to an embodiment of the present disclosure. As shown in FIG. 22, the apparatus further includes a configuration receiving module 2201 and a problem solving module 2202.

The configuration receiving module 2201 is configured to receive a configuration sent by the second base station for solving the multi-card problem.

The problem solving module 2202 is configured to solve the multi-card problem according to the configuration.

In an embodiment, the configuration receiving module is configured to receive the configuration sent by the first base station. The configuration is sent by the second base station to the core network and sent by the core network to the first base station.

In an embodiment, the configuration receiving module is configured to receive the configuration sent by the second base station, in response to handing over to the second base station.

Figure 23:
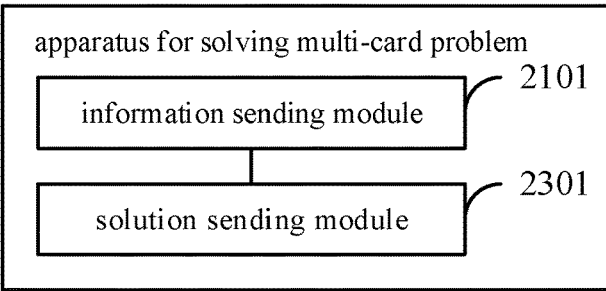
FIG. 23 is a schematic block diagram showing another apparatus for solving a multi-card problem according to an embodiment of the present disclosure.

FIG. 23 is a schematic block diagram showing another apparatus for solving a multi-card problem according to an embodiment of the present disclosure. As shown in FIG. 23, the apparatus further includes a solution sending module 2301.

The solution sending module 2301 is configured to send multi-card problem solved information to the second base station, in response to solving the multi-card problem according to the configuration.

With respect to the apparatus in the above-mentioned embodiments, the specific manners for performing operations for individual modules therein have been described in detail in the embodiments regarding the methods, which will not be elaborated herein.

For the apparatus embodiments, since they basically correspond to the method embodiments, the relevant parts may be referred to the partial description of the method embodiments. The apparatus embodiments described above are merely illustrative, in which the modules described as separate components may be or may not be physically separated, and the components displayed as modules may be or may not be physical modules, that is, they may be located in one place, or may be distributed to a plurality of network modules. Some or all of the modules may be selected according to actual needs to achieve the purpose of the solution of the present disclosure. Those skilled in the art may understand and implement the present disclosure without creative labor.

An embodiment of the present disclosure also provides a communication device. The communication device includes a processor, and a memory for storing computer programs. When the computer programs are executed by the processor, the method for sending the indication described in any of the above-mentioned embodiments, and/or the method for solving the multi-card problem applied to the second base station described in any of the above-mentioned embodiments are/is implemented.

An embodiment of the present disclosure also provides a communication device. The communication device includes a processor, and a memory for storing computer programs. When the computer programs are executed by the processor, the method for sending the information described in any of the above-mentioned embodiments is implemented.

An embodiment of the present disclosure also provides a communication device. The communication device includes a processor, and a memory for storing computer programs. When the computer programs are executed by the processor, the method for solving the multi-card problem applied to the terminal described in any of the above-mentioned embodiments is implemented.

An embodiment of the present disclosure also provides a computer-readable storage medium. The computer-readable storage medium has stored therein computer programs that, when executed by a processor, cause steps in the method for sending the indication described in any of the above-mentioned embodiments, and/or the method for solving the multi-card problem applied to the second base station described in any of the above-mentioned embodiments to be implemented.

An embodiment of the present disclosure also provides a computer-readable storage medium. The computer-readable storage medium has stored therein computer programs that, when executed by a processor, cause steps in the method for sending the information described in any of the above-mentioned embodiments to be implemented.

An embodiment of the present disclosure also provides a computer-readable storage medium. The computer-readable storage medium has stored therein computer programs that, when executed by a processor, cause steps in the method for solving the multi-card problem applied to the terminal described in any of the above-mentioned embodiments to be implemented.

According to embodiments of the present disclosure, the first base station may send the multi-card problem existing in the terminal to the second base station to which the terminal needs to be handed over via the core network in a process of the terminal handing over cells, so as to solve the multi-card problem for the terminal by the second base station.

Figure 24:
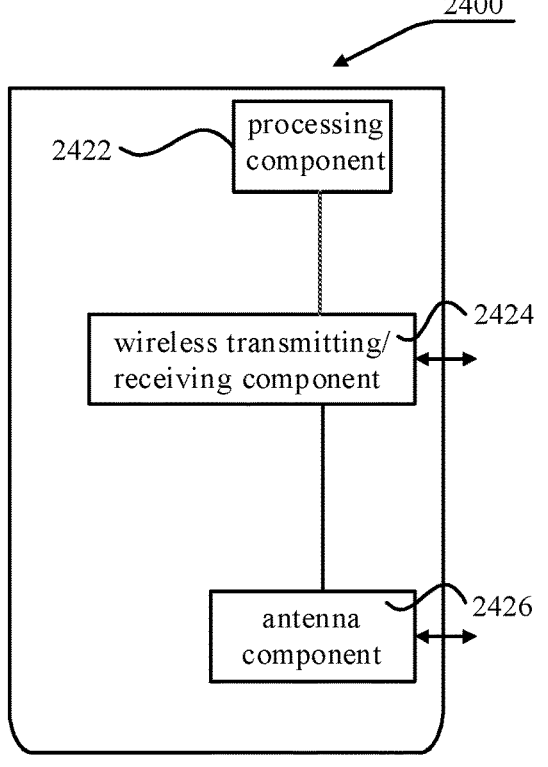
FIG. 24 is a schematic block diagram showing a device for sending an indication and/or solving a multi-card problem according to an embodiment of the present disclosure.

As shown in FIG. 24, FIG. 24 is a schematic block diagram showing a device 2400 for sending an indication and/or solving a multi-card problem according to an embodiment of the present disclosure. The device 2400 may be provided as a base station. Referring to FIG. 24, the device 2400 includes a processing component 2422, a wireless transmitting/receiving component 2424, an antenna component 2426, and a signal processing part unique to a wireless interface, and the processing component 2422 may further include one or more processors. One of the processors in the processing component 2422 may be configured to implement the method for sending the indication described in any of the above-mentioned embodiments, and/or the method for solving the multi-card problem applied to the second base station described in any of the above-mentioned embodiments.

Figure 25:
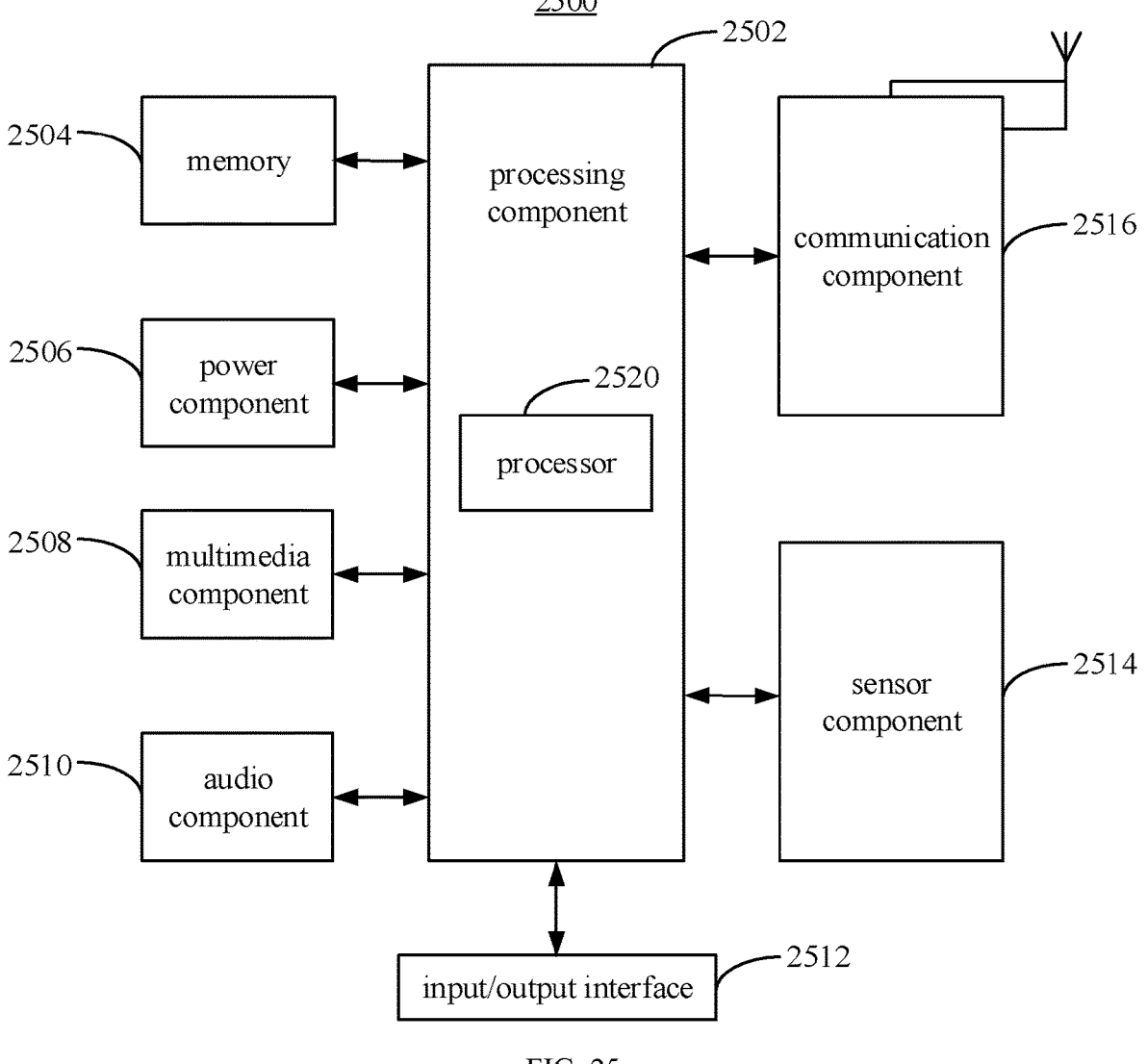
FIG. 25 is a schematic block diagram showing a device for solving a multi-card problem according to an embodiment of the present disclosure.

FIG. 25 is a schematic block diagram showing a device 2500 for solving a multi-card problem according to an embodiment of the present disclosure. For example, the device 2500 may be a mobile phone, a computer, a digital broadcast terminal, a messaging device, a game console, a tablet device, a medical device, a fitness device, a personal digital assistant, or the like.

Referring to FIG. 25, the device 2500 may include one or more of the following components: a processing component 2502, a memory 2504, a power component 2506, a multimedia component 2508, an audio component 2510, an input/output (I/O) interface 2512, a sensor component 2514, and a communication component 2516.

The processing component 2502 typically controls overall operations of the device 2500, such as the operations associated with display, phone calls, data communications, camera operations, and recording operations. The processing component 2502 may include one or more processors 2520 to execute indications to perform all or some of the steps in the above described methods. Moreover, the processing component 2502 may include one or more modules which facilitate the interaction between the processing component 2502 and other components. For instance, the processing component 2502 may include a multimedia module to facilitate the interaction between the multimedia component 2508 and the processing component 2502.

The memory 2504 is configured to store various types of data to support the operation of the device 2500. Examples of such data include indications for any applications or methods operated on the device 2500, contact data, phonebook data, messages, pictures, videos, etc. The memory 2504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2506 provides power to various components of the device 2500. The power component 2506 may include a power management system, one or more power sources, and any other components associated with the generation, management, and distribution of power in the device 2500.

The multimedia component 2508 includes a screen providing an output interface between the device 2500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensor may not merely sense a boundary of a touch or swipe action, but also sense a period of time and a pressure associated with the touch or swipe action. In some embodiments, the multimedia component 2508 includes a front camera and/or a rear camera. The front camera and/or the rear camera may receive an external multimedia datum while the device 2500 is in an operation mode, such as a photographing mode or a video mode. Each of the front camera and the rear camera may be a fixed optical lens system or have focus and optical zoom capability.

The audio component 2510 is configured to output and/or input audio signals. For example, the audio component 2510 includes a microphone (MIC) configured to receive an external audio signal when the device 2500 is in an operation mode, such as a call mode, a recording mode, and a voice recognition mode. The received audio signal may be further stored in the memory 2504 or transmitted via the communication component 2516. In some embodiments, the audio component 2510 further includes a speaker to output audio signals.

The I/O interface 2512 provides an interface between the processing component 2502 and peripheral interface modules, such as a keyboard, a click wheel, buttons, and the like. The buttons may include, but are not limited to, a home button, a volume button, a starting button, and a locking button.

The sensor component 2514 includes one or more sensors to provide status assessments of various aspects of the device 2500. For instance, the sensor component 2514 may detect an open/closed status of the device 2500, relative positioning of components, e.g., the display and the keypad, of the device 2500, a change in position of the device 2500 or a component of the device 2500, a presence or absence of user contact with the device 2500, an orientation or an acceleration/deceleration of the device 2500, and a change in temperature of the device 2500. The sensor component 2514 may include a proximity sensor configured to detect the presence of nearby objects without any physical contact. The sensor component 2514 may also include a light sensor, such as a CMOS or CCD image sensor, for use in imaging applications. In some embodiments, the sensor component 2514 may also include an accelerometer sensor, a gyroscope sensor, a magnetic sensor, a pressure sensor, or a temperature sensor.

The communication component 2516 is configured to facilitate communication, wired or wireless, between the device 2500 and other devices. The device 2500 may access a wireless network based on a communication standard, such as WiFi, 2G, or 3G, 4G LTE, 5G NR or a combination thereof. In an illustrative embodiment, the communication component 2516 receives a broadcast signal or broadcast associated information from an external broadcast management system via a broadcast channel. In an illustrative embodiment, the communication component 2516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In illustrative embodiments, the device 2500 may be implemented with one or more application specific integrated circuits (ASICs), digital signal processors (DSPs), digital signal processing devices (DSPDs), programmable logic devices (PLDs), field programmable gate arrays (FP-GAs), controllers, micro-controllers, microprocessors, or other electronic components, for performing the above-mentioned methods.

In illustrative embodiments, there is also provided a non-transitory computer readable storage medium including instructions, such as included in the memory 2504, executable by the processor 2520 in the device 2500, for performing the above-described methods. For example, the non-transitory computer-readable storage medium may be a ROM, a random access memory (RAM), a CD-ROM, a magnetic tape, a floppy disc, an optical data storage device, and the like.

A method for sending an indication, applied to a first base station is provided. The method includes sending first information to a core network, in response to receiving a multi-card problem of a terminal and determining to hand over the terminal to a second base station, in which the first information carries related information of the multi-card problem, and the first information is configured to instruct the core network to send the related information of the multi-card problem to the second base station.

In some embodiments, the related information of the multi-card problem includes at least one of the multi-card problem, a recommended configuration for solving the multi-card problem.

In some embodiments, the method further includes receiving a measurement report sent by the terminal, in which the measurement report carries the multi-card problem.

In some embodiments, the measurement report further carries at least one of measurement results of capabilities of multiple base stations for solving the multi-card problem, monitoring results of signal qualities of multiple base stations.

In some embodiments, the method further includes determining the second base station from the multiple base stations according to the capabilities of the multiple base stations for solving the multi-card problem and/or the signal qualities of the multiple base stations.

In some embodiments, the measurement report includes indication information configured to indicate that the second base station is capable of solving the multi-card problem, and the method further includes determining the second base station according to the indication information.

In some embodiments, the first information is carried in a handover required signaling.

In some embodiments, the first information is carried in a newly added information element of the handover required signaling, or carried in a source to target transparent container information element of the handover required signaling.

In some embodiments, the method further includes determining a configuration for solving the multi-card problem according to second information from the core network, and performing a corresponding configuration for the terminal according to the configuration.

In some embodiments, the second information is carried in a handover command signaling.

In some embodiments, the second information is carried in a newly added information element of the handover command signaling, or carried in a target to source transparent container information element of the handover command signaling.

In some embodiments, sending the first information to the core network includes sending the first information to the core network, in response to determining that no inter-base station interface is available between the first base station and the second base station.

A method for sending information, applied to a core network is provided. The method includes receiving first information sent by a first base station, in which the first information carries related information of a multi-card problem of a terminal, and the first information is configured to instruct the core network to send the related information of the multi-card problem to a second base station, and sending the related information of the multi-card problem to the second base station.

In some embodiments, the related information of the multi-card problem includes at least one of the multi-card problem, a recommended configuration for solving the multi-card problem.

In some embodiments, the method further includes sending a recommended configuration of the core network for solving the multi-card problem to the second base station.

In some embodiments, sending the related information of the multi-card problem to the second base station includes carrying the related information of the multi-card problem via a handover request signaling and sending it to the second base station.

In some embodiments, sending the related information of the multi-card problem to the second base station includes transparently transmitting a source to target transparent container information element to the second base station, in response to the first information being carried in the source to target transparent container information element of a handover required signaling.

In some embodiments, the method further includes receiving third information sent by the second base station, in which the third information carries a configuration of the second base station for solving the multi-card problem, and carrying the configuration of the second base station for solving the multi-card problem in second information and sending it to the first base station.

In some embodiments, carrying the configuration of the second base station for solving the multi-card problem in the second information and sending it to the first base station includes transparently transmitting a target to source transparent container information element to the first base station, in response to the third information being carried in the target to source transparent container information element of a handover request acknowledgement signaling, or carrying the configuration of the second base station for solving the multi-card problem via a handover command signaling and sending it to the first base station, in response to the third information being carried in the handover request acknowledgement signaling and being not carried in the target to source transparent container information element.

A method for solving a multi-card problem, applied to a second base station is provided. The method includes receiving related information of a multi-card problem of a terminal sent by a core network, and performing a corresponding configuration for the terminal according to a configuration.

In some embodiments, performing the corresponding configuration for the terminal according to the configuration includes at least one of sending third information to the core network, in which the third information carries a configuration of the second base station for solving the multi-card problem, or sending the configuration of the second base station for solving the multi-card problem to the terminal, in response to the terminal handing over to the second base station.

In some embodiments, the third information is carried in a newly added information element of a handover request acknowledgement signaling, or carried in a target to source transparent container information element of the handover request acknowledgement signaling.

In some embodiments, performing the corresponding configuration for the terminal according to the configuration includes determining an allowable delay to solve the multi-card problem, sending the third information to the core network, in response to the delay being less than a first preset delay, and sending the configuration of the second base station for solving the multi-card problem to the terminal, in response to the delay being greater than a second preset delay, and in response to the terminal handing over to the second base station, in which the second preset delay is greater than or equal to the first preset delay.

A method for solving a multi-card problem, applied to a terminal is provided. The method includes sending a multi-card problem and information of a second base station to a first base station, so that the first base station sends first information to a core network, in which the first information carries related information of the multi-card problem, and the first information is configured to instruct the core network to send the related information of the multi-card problem to the second base station.

In some embodiments, sending the information of the second base station to the first base station includes sending a measurement report to the first base station, in which the measurement report at least includes a measurement result of the second base station.

In some embodiments, the measurement result of the second base station includes at least one of a measurement result of a capability of the second base station for solving the multi-card problem, a measurement result of a signal quality of the second base station.

In some embodiments, the method further includes receiving a configuration sent by the second base station for solving the multi-card problem, and solving the multi-card problem according to the configuration.

In some embodiments, receiving the configuration sent by the second base station for solving the multi-card problem includes receiving the configuration sent by the first base station, in which the configuration is sent by the second base station to the core network and sent by the core network to the first base station.

In some embodiments, receiving the configuration sent by the second base station for solving the multi-card problem includes receiving the configuration sent by the second base station, in response to handing over to the second base station.

In some embodiments, the method further includes sending multi-card problem solved information to the second base station, in response to solving the multi-card problem according to the configuration.

An apparatus for sending an indication, applied to a first base station is provided. The apparatus includes an information sending module configured to send first information to a core network, in response to receiving a multi-card problem of a terminal and determining to hand over the terminal to a second base station, in which the first information carries related information of the multi-card problem, and the first information is configured to instruct the core network to send the related information of the multi-card problem to the second base station.

An apparatus for sending information, applied to a core network is provided. The apparatus includes a first information receiving module configured to receive first information sent by a first base station, in which the first information carries related information of a multi-card problem of a terminal, and the first information is configured to instruct the core network to send the related information of the multi-card problem to a second base station, and a first information sending module configured to send the related information of the multi-card problem to the second base station.

An apparatus for solving a multi-card problem, applied to a second base station is provided. The apparatus includes an information receiving module configured to receive related information of a multi-card problem of a terminal sent by a core network, and a problem solving module configured to perform a corresponding configuration for the terminal according to a configuration.

An apparatus for solving a multi-card problem, applied to a terminal is provided. The apparatus includes an information sending module configured to send a multi-card problem and information of a second base station to a first base station, so that the first base station sends first information to a core network, in which the first information carries related information of the multi-card problem, and the first information is configured to instruct the core network to send the related information of the multi-card problem to the second base station.

A communication device is provided. The communication device includes a processor, and a memory for storing computer programs. When the computer programs are executed by the processor, the above-mentioned method for sending the indication, and/or the above-mentioned method for solving the multi-card problem applied to the second base station are/is implemented.

A communication device is provided. The communication device includes a processor, and a memory for storing computer programs. When the computer programs are executed by the processor, the above-mentioned method for sending the information is implemented.

A communication device is provided. The communication device includes a processor, and a memory for storing computer programs. When the computer programs are executed by the processor, the above-mentioned method for solving the multi-card problem applied to the terminal is implemented.

A computer-readable storage medium is provided. The computer-readable storage medium has stored therein computer programs that, when executed by a processor, cause steps in the above-mentioned method for sending the indication, and/or the above-mentioned method for solving the multi-card problem applied to the second base station to be implemented.

A computer-readable storage medium is provided. The computer-readable storage medium has stored therein computer programs that, when executed by a processor, cause steps in the above-mentioned method for sending the information to be implemented.

A computer-readable storage medium is provided. The computer-readable storage medium has stored therein computer programs that, when executed by a processor, cause steps in the above-mentioned method for solving the multi-card problem applied to the terminal to be implemented.

Other embodiments of the present disclosure will be apparent to those skilled in the art from consideration of the specification and practice of the present disclosure described here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure merely be limited by the appended claims.

It is to be noted that in this context, relational terms such as first and second are used solely to distinguish one entity or operation from another entity or operation, it does not necessarily require or imply any such actual relationship or sequence between these entities or operations. The term "include", "comprise" or any other variation thereof is intended to cover a non-exclusive inclusion, so that a process, method, article or device that includes a series of elements does not merely include those elements, but also includes other elements that are not explicitly listed, or also includes elements inherent in such a process, method, article or device. Without further restrictions, an element defined by the statement "including a . . . " does not exclude the existence of another identical element in the process, method, article or device that includes the element.

The methods and apparatuses provided by embodiments of the present disclosure have been described in detail above, and specific examples are used to illustrate the principle and implementation of the present disclosure. The description of the above embodiments is merely used to help understand the methods and core ideas of the present disclosure. At the same time, for those skilled in the art, there will be some changes in the specific implementation and application scope according to the idea of the present disclosure. In summary, the content of the specification should not be construed as a limitation on the present disclosure.

What is claimed is:

1. A method for sending an indication, applied to a first base station, comprising:
    sending first information to a core network, in response to receiving a multi-card problem of a terminal and determining to hand over the terminal to a second base station;
    wherein the first information carries related information of the multi-card problem, and the first information is configured to instruct the core network to send the related information of the multi-card problem to the second base station;
    wherein the multi-card problem comprises a conflict between a communication operation of a first subscriber identity module (SIM) card in the terminal with the first base station and a communication operation of a second SIM card in the terminal with the second base station, and the related information of the multi-card problem comprises a recommended configuration for solving the multi-card problem.

2. The method of claim 1, further comprising:
    receiving a measurement report sent by the terminal, wherein the measurement report carries the multi-card problem.

3. The method of claim 2, wherein the measurement report further carries at least one of:
    measurement results of capabilities of multiple base stations for solving the multi-card problem;
    monitoring results of signal qualities of multiple base stations.

4. The method of claim 3, further comprising:
    determining the second base station from the multiple base stations according to the capabilities of the multiple base stations for solving the multi-card problem and/or the signal qualities of the multiple base stations; or
    determining the second base station according to indication information, wherein the measurement report comprises the indication information configured to indicate that the second base station is capable of solving the multi-card problem.

5. The method of claim 1, wherein the first information is carried in a handover required signaling; or
    the first information is carried in a handover required signaling, wherein the first information is carried in a newly added information element of the handover required signaling, or carried in a source to target transparent container information element of the handover required signaling.

6. The method of claim 1, further comprising:

determining a configuration for solving the multi-card problem according to second information from the core network; and performing a corresponding configuration for the terminal according to the configuration.

7. The method of claim 6, wherein the second information is carried in a handover command signaling; or wherein the second information is carried in a handover command signaling, wherein the second information is carried in a newly added information element of the handover command signaling, or carried in a target to source transparent container information element of the handover command signaling.

8. The method of claim 1, wherein sending the first information to the core network comprises:

sending the first information to the core network, in response to determining that no inter-base station interface is available between the first base station and the second base station.

9. A communication device, comprising:

a processor; and a memory for storing computer programs;

wherein when the computer programs are executed by the processor, the method for sending the indication of claim 1 is implemented.

10. A method for sending information, applied to a core network, comprising:

receiving first information sent by a first base station, wherein the first information carries related information of a multi-card problem of a terminal, and the first information is configured to instruct the core network to send the related information of the multi-card problem to a second base station; and sending the related information of the multi-card problem to the second base station;

wherein the multi-card problem comprises a conflict between a communication operation of a first subscriber identity module (SIM) card in the terminal with the first base station and a communication operation of a second SIM card in the terminal with the second base station, and the related information of the multi-card problem comprises a recommended configuration for solving the multi-card problem.

11. The method of claim 10, further comprising:

sending a recommended configuration of the core network for solving the multi-card problem to the second base station.

12. The method of claim 10, wherein sending the related information of the multi-card problem to the second base station comprises:

carrying the related information of the multi-card problem via a handover request signaling and sending it to the second base station; or transparently transmitting a source to target transparent container information element to the second base station, in response to the first information being carried in the source to target transparent container information element of a handover required signaling.

13. The method of claim 10, further comprising:

receiving third information sent by the second base station, wherein the third information carries a configuration of the second base station for solving the multi-card problem; and carrying the configuration of the second base station for solving the multi-card problem in second information and sending it to the first base station.

14. The method of claim 13, wherein carrying the configuration of the second base station for solving the multi-card problem in the second information and sending it to the first base station comprises:

transparently transmitting a target to source transparent container information element to the first base station, in response to the third information being carried in the target to source transparent container information element of a handover request acknowledgement signaling; or carrying the configuration of the second base station for solving the multi-card problem via a handover command signaling and sending it to the first base station, in response to the third information being carried in the handover request acknowledgement signaling and being not carried in the target to source transparent container information element.

15. A method for solving a multi-card problem, applied to a terminal, comprising:

sending a multi-card problem and information of a second base station to a first base station, so that the first base station sends first information to a core network;

wherein the first information carries related information of the multi-card problem, and the first information is configured to instruct the core network to send the related information of the multi-card problem to the second base station;

wherein the multi-card problem comprises a conflict between a communication operation of a first subscriber identity module (SIM) card in the terminal with the first base station and a communication operation of a second SIM card in the terminal with the second base station, and the related information of the multi-card problem comprises a recommended configuration for solving the multi-card problem.

16. The method of claim 15, wherein sending the information of the second base station to the first base station comprises:

sending a measurement report to the first base station, wherein the measurement report at least comprises a measurement result of the second base station.

17. The method of claim 15, wherein the method further comprises:

receiving a configuration sent by the second base station for solving the multi-card problem, and solving the multi-card problem according to the configuration; or receiving a configuration sent by the second base station for solving the multi-card problem, and solving the multi-card problem according to the configuration, wherein receiving the configuration sent by the second base station for solving the multi-card problem comprises: receiving the configuration sent by the first base station, the configuration is sent by the second base station to the core network and sent by the core network to the first base station; or receiving a configuration sent by the second base station for solving the multi-card problem, and solving the multi-card problem according to the configuration, wherein receiving the configuration sent by the second base station for solving the multi-card problem comprises: receiving the configuration sent by the second base station in response to handing over to the second base station.

18. The method of claim 17, further comprising:

sending multi-card problem solved information to the second base station, in response to solving the multi-card problem according to the configuration.

\*   \*   \*   \*   \*